US008844137B2

(12) United States Patent
Cai et al.

(10) Patent No.: US 8,844,137 B2
(45) Date of Patent: Sep. 30, 2014

(54) EJECTION DEVICES FOR INKJET PRINTERS AND METHOD FOR FABRICATING EJECTION DEVICES

(71) Applicant: Funai Electric Co., Ltd., Osaka (JP)

(72) Inventors: Xiaorong Cai, Lexington, KY (US); Jiandong Fang, Lexington, KY (US); Xiaoming Wu, Lexington, KY (US); Elaine Yeap Money, Lexington, KY (US); Eunki Hong, Lexington, KY (US); Yimin Guan, Lexington, KY (US); Burton Joyner, II, Lexington, KY (US); Sean Terrance Weaver, Union, KY (US); David Graham, Lexington, KY (US); Zach Reitmeier, Oak Ridge, NC (US)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 13/925,424

(22) Filed: Jun. 24, 2013

(65) Prior Publication Data

US 2013/0284694 A1 Oct. 31, 2013

Related U.S. Application Data

(62) Division of application No. 13/097,594, filed on Apr. 29, 2011, now abandoned.

(51) Int. Cl.

| | |
|---|---|
| ***B21D 53/76*** | (2006.01) |
| ***B23P 17/00*** | (2006.01) |
| ***B41J 2/15*** | (2006.01) |
| ***B41J 2/145*** | (2006.01) |
| ***B41J 2/14*** | (2006.01) |
| ***B41J 2/16*** | (2006.01) |

(52) U.S. Cl.

CPC .............. *B41J 2/1628* (2013.01); *B41J 2/1631* (2013.01); *B41J 2/1603* (2013.01); *B41J 2/1639* (2013.01); *B41J 2/14032* (2013.01); *B41J 2/164* (2013.01); *B41J 2/162* (2013.01); *B41J 2/1606* (2013.01); *B41J 2/1629* (2013.01)

USPC ................................ 29/890.1; 347/40; 347/47

(58) Field of Classification Search

CPC ...... B41J 2/1603; B41J 2/1626; B41J 2/1631; B41J 2/1623

USPC ...................................... 29/890.1; 347/40, 47

See application file for complete search history.

(56) References Cited

U.S. PATENT DOCUMENTS

| | | | | |
|---|---|---|---|---|
| 6,482,574 | B1 * | 11/2002 | Ramaswami et al. | 430/320 |
| 6,942,318 | B2 * | 9/2005 | Fartash | 347/44 |

(Continued)

*Primary Examiner* — David Angwin

(74) *Attorney, Agent, or Firm* — Amster, Rothstein & Ebenstein LLP

(57) ABSTRACT

Disclosed is an ejection device for an inkjet printer that includes an ejection chip having a substrate and at least one fluid ejecting element. The ejection device further includes a fluidic structure configured over the ejection chip. The fluidic structure includes a nozzle plate composed of an organic material and includes a plurality of nozzles. The fluidic structure further includes a flow feature layer configured in between the ejection chip and the nozzle plate. The flow feature layer is composed of an organic material and includes a plurality of flow features. Furthermore, the fluidic structure includes a liner layer encapsulating the nozzle plate. The liner layer further at least partially encapsulates each flow feature of the plurality of flow features. The liner layer is composed of an inorganic material. Further disclosed is a method for fabricating the ejection device.

7 Claims, 18 Drawing Sheets

(56) References Cited

U.S. PATENT DOCUMENTS

| | | | | |
|---|---|---|---|---|
| 7,600,856 | B2 * | 10/2009 | Lebens et al. | 347/56 |
| 7,628,472 | B2 * | 12/2009 | Tomizawa et al. | 347/65 |
| 7,699,441 | B2 * | 4/2010 | Lebens | 347/64 |
| 7,735,965 | B2 * | 6/2010 | Goin et al. | 347/47 |
| 8,083,322 | B2 * | 12/2011 | Tomizawa et al. | 347/56 |
| 8,251,490 | B2 * | 8/2012 | Ciampini et al. | 347/45 |
| 8,585,180 | B2 * | 11/2013 | Bhowmik et al. | 347/45 |
| 2008/0136868 | A1 * | 6/2008 | Lebens | 347/47 |
| 2009/0085972 | A1 * | 4/2009 | Sim et al. | 347/47 |
| 2009/0109260 | A1 * | 4/2009 | Wiszniewski et al. | 347/47 |
| 2009/0233386 | A1 * | 9/2009 | Guan et al. | 438/21 |

* cited by examiner

EJECTION DEVICES FOR INKJET PRINTERS AND METHOD FOR FABRICATING EJECTION DEVICES

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of Disclosure

The present disclosure relates generally to inkjet printers, and more particularly, to ejection devices for inkjet printers and a method for fabricating the ejection devices.

2. Description of the Related Art

A typical ejection device (printhead) of an inkjet printer includes an ejector chip, a nozzle plate either attached or formed with the ejector chip, and a Tape Automated Bond (TAB) circuit for electrically connecting the ejector chip to the inkjet printer during use. The ejector chip may be fabricated using a silicon substrate (wafer) having a plurality of fluid ejecting elements adapted to eject a fluid (such as ink). Further, the ejection device may also include flow features (fluid chambers and fluid supply channels) formed in a thick film layer deposited on the silicon substrate and below the nozzle plate. Alternatively, the flow features may be ablated along with nozzles of the nozzle plate. The nozzle plate and the flow features may be formed of a polymeric photoresist material, i.e., an organic material.

Considering that various types of fluids may be used with the ejection device, compatibility between the fluids and the polymeric photoresist material of the nozzle plate and the flow features is of great significance, specifically, for the current Photo-Imageable Nozzle Plate (PINP) based ejection devices. Further, such compatibility is related to print quality and the service lifetime of the ejection devices. Specifically, an incompatible fluid may cause damage/degradation to the polymeric photoresist material of the nozzle plate and the flow features, thereby affecting the print quality and shortening service lifetime of the ejection devices.

Accordingly, significant efforts have been made to develop fluids that are compatible with PINP based ejection devices, and/or to develop polymeric photoresist materials with high chemical resistance towards the fluids. However, fluid stability has typically been compromised while developing better polymeric photoresist materials. Alternatively, mechanical properties of the polymeric photoresist materials have been sacrificed for achieving better fluid compatibility. Thus, such strategies have assisted in achieving improved ejection devices and print quality only to some extent.

Although current PINP based ejection devices work well with available aqueous fluids, fluid-nozzle incompatibility is still challenging for the advancement of PINP based inkjet technology. Further, it has been observed that polymeric photoresist materials of flow features and nozzle plates are easily attacked by surfactants; dispersants; other additives; and a few organic solvents such as humectants, which are used as fluid ingredients. Though some of such fluid ingredients are beneficial for fluid property modification in order to produce fluids with better functionalities (such as high reliability, quality jetting, high resistance to smear and so forth), however, the fluid ingredients may be unsuitable for being employed in current fluid formulation due to severe incompatibility with the current polymeric photoresist materials used for PINP based ejection devices.

For examples, higher content of 2-pyrrolidine that is used as a fluid ingredient may improve fluid jetting quality. Similarly, use of higher content of hexyl carbitol as a fluid ingredient may improve fluid drying time on a print medium, such as paper. However, the use of the aforementioned materials in the fluids has resulted in damage to the current materials used for PINP based election devices. Specifically, such materials act as attacking organic ingredients that are capable of penetrating into the polymeric photoresist materials of the nozzle plates and the flow features to dissolve and soften the respective polymeric network, thereby resulting in reduced mechanical strength of the PINP based ejection devices along with deterioration of fluid ejecting (jetting) performance.

Therefore, the PINP based ejection devices may find appropriate application only with benign aqueous fluids, but neither with aqueous fluids consisting of incompatible organic solvents nor with organic-based fluids.

Based on the above limitations, nozzle plates composed of inorganic materials (such as silicon oxide, silicon nitride and the like) have been employed in various currently available ejection devices. Specifically, the inorganic materials possessing high solvent resistance are suitable for both aqueous and solvent-based inks. However, pure inorganic nozzle plates (such as the nozzle plates composed of silicon oxide/silicon nitride) may only have a limited thickness (below about 10 microns) due to an extreme slow deposition and etching rates for the inorganic materials. Further, nozzle plates composed of inorganic materials have high fragility due to residue stress and an extremely thin format.

Similarly, various other fluidic structures (re flow features and nozzle plates) have been formed by depositing a thick layer of an inorganic material (such as oxide/silicon nitride) on substrates. However, formation of such fluidic structures requires processing of thick layers that is associated with long deposition and etching time. Further, such thick layers easily tend to crack due to stress build-up. Additionally, it is difficult to create retrograde nozzles, which is important to eject stable fluid drops. Moreover, formation of such fluidic structures involves creation of deep trenches. However, these deep trenches may serve as areas for fluid entrapment. Further, maintenance of the fluidic structures, by techniques such as wiping, becomes difficult due to the presence of deep trenches.

Furthermore, fluidic structures that incorporate organic materials in nozzle plate and fluid chamber wall have also been formed. Such fluidic structures include an inorganic layer located on the nozzle plate and the fluid chamber wall, to improve adhesion between a substrate and the nozzle plate. However, various portions (such as a top portion and inner portions) of the nozzle plate and nozzles thereof are exposed to the atmosphere, thereby, making the fluidic structures vulnerable to a working fluid that is capable of degrading the organic material.

Other alternate fluidic structures have been formed by planarization of a surface of an ejection device by filling trenches with a polymeric material (organic) and covering a top surface with an additional layer as a thin nozzle plate. Since the thickness of the nozzle plate generally determines the nozzle length, it is difficult to create long nozzles that are required for either ejecting large fluid drops or improving the directionality of the ejected fluid drops, while using such fluidic structures.

Accordingly, there persists a need for effective and efficient ejection devices for inkjet printers, and a method for fabricating the ejection devices, for achieving better and long-lasting fluid compatibility with fluidic structures (nozzle plate and flow features) of the ejection devices, to prevent damage/degradation to the fluidic structures and fluid entrapment within the fluidic structures. Further, there persists a need for an effective and efficient method for fabricating ejection devices in order to form long nozzles in nozzle plates for either ejecting large fluid drops or improving the directionality of the ejected fluid drops.

SUMMARY OF THE DISCLOSURE

In view of the foregoing disadvantages inherent in the prior art, the general purpose of the present disclosure is to provide ejection devices for inkjet printers and a method for fabricating the ejection devices, by including all the advantages of the prior art, and overcoming the drawbacks inherent therein.

In one aspect, the present disclosure provides an ejection device for an inkjet printer. The ejection device includes an ejection chip. The ejection chip includes a substrate and at least one fluid ejecting element carried by the substrate and adapted to eject a fluid. The ejection device further includes a fluidic structure configured over the ejection chip. The fluidic structure includes a nozzle plate composed of an organic material. The nozzle plate includes a plurality of nozzles. The fluidic structure further includes a flow feature layer configured in between the ejection chip and the nozzle plate. The flow feature layer is composed of an organic material. The flow feature layer includes a plurality of flow features. Each flow feature of the plurality of flow features is configured in fluid communication with one or more corresponding nozzles of the plurality of nozzles and one or more corresponding fluid ejecting elements. Furthermore, the fluidic structure includes a liner layer encapsulating the nozzle plate such that each nozzle of the plurality of nozzles is coated with the liner layer. Further, the liner layer at least partially encapsulates the each flow feature of the plurality of flow features. The liner layer is composed of an inorganic material.

In another aspect, the present disclosure provides an ejection device for an inkjet printer. The ejection device includes an ejection chip. The ejection chip includes a substrate and at least one fluid ejecting element carried by the substrate and adapted to eject a fluid. The ejection device further includes a fluidic structure configured over the ejection chip. The fluidic structure includes a nozzle plate composed of an organic material. The nozzle plate includes a plurality of nozzles. The fluidic structure further includes a flow feature layer configured in between the ejection chip and the nozzle plate. The flow feature layer is composed of an organic material. Further, the flow feature layer includes a plurality of flow features. Each flow feature of the plurality of flow features is configured in fluid communication with one or more corresponding nozzles of the plurality of nozzles and one or more corresponding fluid ejecting elements. The fluidic structure also includes a first liner layer deposited between the flow feature layer and the nozzle plate for coating a bottom in surface of the nozzle plate and each nozzle of the plurality of nozzles, and for at least partially encapsulating the each flow feature of the plurality of flow features. Furthermore, the fluidic structure includes a second liner layer deposited over a top surface of the nozzle plate.

In yet another aspect, the present disclosure provides a method for fabricating an ejection device for an inkjet printer. The method includes depositing a first layer of an organic material on an ejection chip. The ejection chip includes a substrate and at least one fluid ejecting element carried by the substrate. The method further includes patterning the first layer of the organic material to configure a flow feature layer over the ejection chip. Furthermore, the method includes depositing a first layer of an inorganic material over the first layer of the organic material. Also, the method includes patterning the first layer of the inorganic material to configure a plurality of openings therewithin. Additionally, the method includes depositing a second layer of an organic material over the first layer of the inorganic material to configure a nozzle plate of the ejection device. Moreover, the method includes processing the second layer of the organic material by one of patterning and planarization. In addition, the method includes depositing a second layer of one of an inorganic material and a hydrophobic material over the second layer of the organic material. The method also includes patterning the second layer of the one of the inorganic material and the hydrophobic material to configure a plurality of openings corresponding to the plurality of openings of the first layer of the inorganic material. Further, the method includes removing a plurality of portions of the first layer of the organic material through the plurality of openings of the first layer of the inorganic material in order to configure a plurality of flow features within the flow feature layer. One of the processing of the second layer of the organic material and the removal of the plurality of portions of the first layer of the organic material, results in configuring a plurality of nozzles in the nozzle plate. Further, one or more nozzles of the plurality of nozzles are in fluid communication with a corresponding flow feature of the plurality of flow features.

BRIEF DESCRIPTION OF THE DRAWINGS

The above-mentioned and other features and advantages of the present disclosure, and the manner of attaining them, will become more apparent and will be better understood by reference to the following description of embodiments of the disclosure taken in conjunction with the accompanying drawings wherein.

DETAILED DESCRIPTION

It is to be understood that various omissions and substitutions of equivalents are contemplated as circumstances may suggest or render expedient, but these are intended to cover the application or implementation without departing from the spirit or scope of the claims of the present disclosure. It is to be understood that the present disclosure is not limited in to the details of components set forth in the following description. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the terms "a" and "an" herein do not denote a limitation of quantity, but rather denote the presence of at least one of the referenced item.

The present disclosure provides an ejection device for an inkjet printer, and particularly for a thermal inkjet printer. Various embodiments of the ejection device of the present disclosure have been explained in conjunction with FIGS. 1-6.

Figure 1:
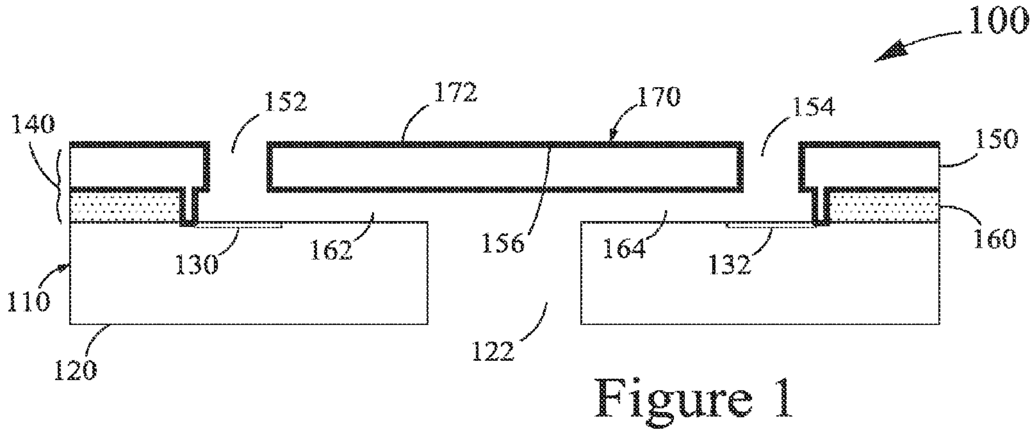
FIG. 1 depicts an ejection device for an inkjet printer, in accordance with an embodiment of the present disclosure.

FIG. 1 depicts an ejection device 100 for an inkjet printer. The ejection device 100 includes an ejection chip 110, such as a silicon heater chip. The ejection chip 110 includes a substrate 120 (silicon wafer). The substrate 120 includes at least one fluid such as a fluid via 122. Further, the ejection chip 110 includes at least one fluid ejecting element, such as fluid ejecting elements 130, 132, carried by the substrate 120. The fluid ejecting elements 130, 132 are adapted to eject a fluid, such as an ink. Further, the at least one fluid via of the substrate 120 is adapted for feeding the fluid to one or more fluid ejecting elements of the at least one fluid ejecting element. Specifically, the fluid via 122 is adapted to feed the fluid to the fluid ejecting elements 130, 132.

The ejection device 100 further includes a fluidic structure 140 configured over the ejection chip 110. The fluidic structure 140 includes a nozzle plate 150 composed of an organic material. The nozzle plate 150 includes a plurality of nozzles, such as nozzles 152, 154. The nozzles 152, 154 may be configured to have any shape, such as a cylindrical shape, an angular shape, and the like. The fluidic structure 140 further includes a flow feature layer 160 configured in between the ejection chip 110 and the nozzle plate 150. The flow feature layer 160 is composed of an organic material. The flow feature layer 160 includes a plurality of flow features, such as flow features 162, 164 teach including a fluid chamber and a fluid supply channel). Each flow feature of the plurality of flow features is configured in fluid communication with one or more corresponding nozzles of the plurality of nozzles and one or more corresponding fluid ejecting elements of the at least one fluid ejecting element. Specifically, the flow feature 162 is configured in fluid communication with the corresponding nozzle 152 and the corresponding fluid ejecting element 130. Similarly, the flow feature 164 is configured in fluid communication with the corresponding nozzle 154 and the corresponding fluid ejecting element 132.

The nozzle plate 150 and the flow feature layer 160 may be composed of polymeric materials (organic materials), such as photoresist materials including positive-tone polymeric materials and negative-tone polymeric materials.

The fluidic structure 140 also includes a liner layer 170 encapsulating the nozzle plate 150 such that each nozzle of the plurality of nozzles is coated with the liner layer 170. Specifically, the liner layer 170 coats the internal walls (not numbered) of the each nozzle of the plurality of nozzles. The liner layer 170 encapsulates the nozzle plate 150 such that a portion 172 of the liner layer 170 covers a top surface 156 of the nozzle plate 150. The liner layer 170 further at least partially encapsulates the each flow feature of the plurality of flow features, such as the flow features 162, 164. The liner layer 170 is composed of an inorganic material.

Specifically, the liner layer 170 is an inorganic protective coating composed of materials, such as silicon oxide, formed by techniques such as low temperature chemical vapor deposition, plasma enhanced chemical vapor deposition (PECVD), Radio Frequency (RF) sputtering, and e-beam/thermal evaporation. Alternatively, the linear layer 170 may be a coating of silicon nitride formed by techniques such as PECVD and RF sputtering. Further, the liner layer 170 may be a coating of Pyrex glass formed by RF sputtering. Furthermore, the liner layer 170 may be a coating of amorphous silicon formed by RF sputtering. Also, the liner layer 170 may be a coating of silicon carbide formed by RF sputtering. In addition, the liner layer 170 may be a coating of metal oxides (e.g. aluminum oxide, titanium oxide, zinc oxide, and the like) formed by RF sputtering. Further, the liner layer 170 may be a coating of metals formed by techniques, such as metal-organic chemical vapor deposition, diode (DC) sputtering/RF sputtering, electro-less plating and e-beam/thermal evaporation. Further, the maximum deposition temperature of the liner layer 170 may be determined by the thermal property of the chosen polymers for the nozzle plate 150 and the plurality of now features. For example, the highest allowable temperature is about 400° C. for polyimide based nozzle plates and flow features.

The ejection device 100 may also include a layer (not shown) of a hydrophobic material deposited over the portion 172 of the liner layer 170. Such a layer may be composed of any hydrophobic material as known in the art for coating components of ejection devices.

Figure 2:
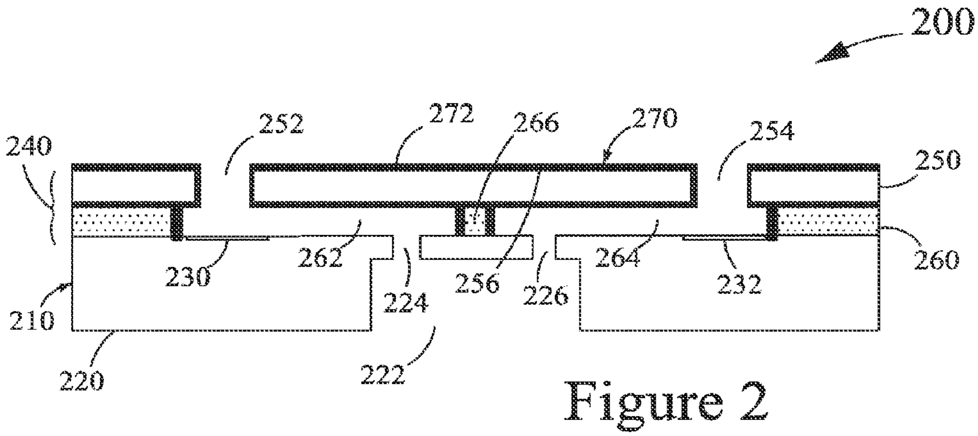
FIG. 2 depicts an ejection device for an inkjet printer, in accordance with another embodiment of the present disclosure.

FIG. 2 depicts an ejection device 200 for an inkjet primer. The ejection device 200 is similar to the ejection device 100, and includes an ejection chip 210 shaving a substrate 220. The substrate 220 may include at least one fluid via, such as a fluid via 222. Further, the ejection chip 210 includes at least one fluid ejecting element, such as fluid ejecting elements 230, 232, carried by the substrate 220. The fluid ejecting elements 230, 232 are adapted to eject a fluid, such as an ink. Further, the at least one fluid via of the substrate 220 may be adapted for feeding the fluid to one or more fluid ejecting elements of the at least one fluid ejecting element. Specifically, the fluid via 222 may be adapted to feed the fluid to the fluid ejecting elements 230, 232.

The substrate 220 also includes a plurality of slots, such as slots 224, 226. Each slot of the slots 224, 226, is adapted for feeding the fluid to the one or more fluid ejecting elements of the at least one fluid ejecting element. Specifically, the slots 224, 226 may be adapted to feed the fluid to the fluid ejecting elements 230, 232 through the fluid via 222.

The ejection device 200 further includes a fluidic structure 240 configured over the ejection chip 210. The fluidic structure 240 includes a nozzle plate 250 composed of an organic material. The nozzle plate 250 includes a plurality of nozzles, such as nozzles 252, 254. The nozzles 252, 254 are shown to be cylindrical in shape. However, the nozzles 252, 254 may be configured to have any other shape. The fluidic structure 240 further includes a flow feature layer 260 configured in between the ejection chip 210 and the nozzle plate 250. The flow feature layer 260 is composed of an organic material. The flow feature layer 260 includes a plurality of flow features, such as flow features 262, 264. Each flow feature of the plurality of flow features is configured in fluid communication with one or more corresponding nozzles of the plurality of nozzles and one or more corresponding fluid ejecting elements of the at least one fluid ejecting element. Specifically, the flow feature 262 is configured in fluid communication with the corresponding nozzle 252 and the corresponding fluid ejecting element 230. Similarly, the flow feature 264 is configured in fluid communication with the corresponding nozzle 254 and the corresponding fluid ejecting element 232.

Further, the flow feature layer 260 includes a wall 266 to separate each two consecutive slots, such as the slots 224, 226, of the plurality of slots of the substrate 220.

The fluidic structure 240 also includes a liner layer 270 encapsulating the nozzle plate 250 such that each nozzle of the plurality of nozzles is coated with the liner layer 270. Specifically, the liner layer 270 coats the internal walls (not numbered) of the each nozzle of the plurality of nozzles. The liner layer 270 encapsulates the nozzle plate 250 such that a portion 272 of the liner layer 270 covers a top surface 256 of the nozzle plate 250. The liner layer 270 further at least partially encapsulates the each flow feature of the plurality of flow features, such as the flow features 262, 264. Furthermore, the liner layer 270 encapsulates the wall 266. The liner layer 270 is composed of an inorganic material.

The ejection device 200 may also include a layer (not shown) of a hydrophobic material deposited over the portion 272 of the liner layer 270. Such a layer may be composed of any hydrophobic material as known in the art for coating components of ejection devices.

It will be evident that the nozzle plate 250, the flow feature layer 260, and the liner layer 270 may be composed of materials similar to those described for the manufacturing of the nozzle plate 150, the flow feature layer 150, and the liner layer 170 of the ejection device 100 of FIG. 1.

Figure 3:
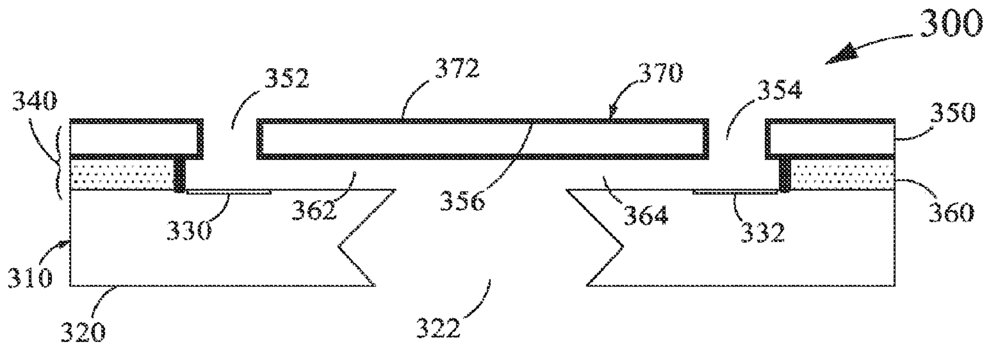
FIG. 3 depicts an ejection device for an inkjet printer, in accordance with yet another embodiment of the present disclosure.

FIG. 3 depicts an ejection device 300 for an inkjet printer. The ejection device 300 is similar to the ejection devices 100 and 200, and includes an ejection chip 310. The election chip 310 includes a substrate 320. The substrate 320 includes at least one fluid via, such as a fluid via 322. The fluid via 322 is characteristic of having a <111> crystal plane, and is different in shape and size from the fluid vias 122, 222 of the ejection devices 100 and 200, respectively.

Further, the ejection chip 310 includes at least one fluid ejecting element, such as fluid ejecting elements 330, 332, carded by the substrate 320. The fluid ejecting elements 330, 332 are adapted to eject a fluid, such as an ink. Further, the at least one fluid via of the substrate 320 is adapted for feeding the fluid to one or more fluid ejecting elements of the at least one fluid ejecting element. Specifically, the fluid via 322 is adapted to feed the fluid to the fluid ejecting elements 330, 332.

The ejection device 300 further includes a fluidic structure 340 configured over the ejection chip 310. The fluidic structure 340 includes a nozzle plate 350 composed of an organic material. The nozzle plate 350 includes a plurality of nozzles, such as nozzles 352, 354. The nozzles 352, 354 are shown to be cylindrical in shape. However, the nozzles 352, 354 may be configured to have any other shape. The fluidic structure 340 further includes a flow feature layer 360 configured in between the ejection chip 310 and the nozzle plate 350. The flow feature layer 360 is composed of an organic material. The flow feature layer 360 includes a plurality of flow features, such as flow features 362, 364. Each flow feature of the plurality of flow features is configured in fluid communication with one or more corresponding nozzles of the plurality of nozzles and one or more corresponding fluid ejecting elements of the at least one fluid ejecting element. Specifically, the flow feature 362 is configured in fluid communication with the corresponding nozzle 352 and the corresponding fluid electing element 330. Similarly, the flow feature 364 is configured in fluid communication with the corresponding nozzle 354 and the corresponding fluid ejecting element 332.

The fluidic structure 340 also includes a liner layer 370 encapsulating the nozzle plate 350 such that each nozzle of the plurality of nozzles is coated with the liner layer 370. Specifically, the liner layer 370 coats the internal walls (not numbered) of the each nozzle of the plurality of nozzles. The liner layer 370 encapsulates the nozzle plate 350 such that a portion 372 of the liner layer 370 covers a top surface 356 of the nozzle plate 350. The liner layer 370 further at least partially encapsulates the each flow feature of the plurality of flow features, such as the flow features 362, 364. The liner layer 370 is composed of an inorganic material.

The ejection device 300 may also include a layer (not shown) of a hydrophobic material deposited over the portion 372 of the liner layer 370. Such a layer may be composed of any hydrophobic material as known in the art for coating components of ejection devices.

It will be evident that the nozzle plate 350, the flow feature layer 360, and the liner layer 370 may be composed of materials similar to those described for the manufacturing of the nozzle plate 150, the flow feature layer 160, and the liner layer 170, of the ejection device 100 of FIG. 1.

Figure 4:
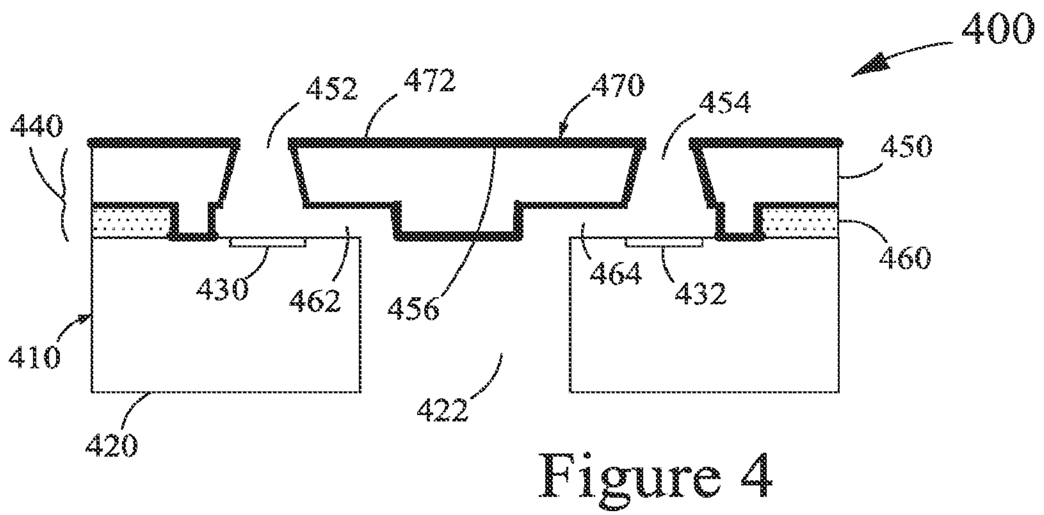
FIG. 4 depicts an ejection device for an inkjet printer, in accordance with still another embodiment of the present disclosure.

FIG. 4 depicts an ejection device 400 for an inkjet printer. The ejection device 400 is similar to the ejection devices 100, 200, and 300, and includes an ejection chip 410 having a substrate 420. The substrate 420 includes at least one fluid via, such as a fluid via 422. Further, the ejection chip 410 includes at least one fluid ejecting element, such as fluid ejecting elements 430, 432, carried by the substrate 420. The fluid ejecting elements 430, 432 are adapted to eject a fluid, such as an ink. Further, the at least one fluid via of the substrate 420 is adapted for feeding the fluid to one or more fluid ejecting elements of the at least one fluid ejecting element. Specifically, the fluid via 422 is adapted to feed the fluid to the fluid electing elements 430, 432.

The ejection device 400 further includes a fluidic structure 440 configured over the ejection chip 410. The fluidic structure 440 includes a nozzle plate 450 composed of an organic material. The nozzle plate 450 includes a plurality of nozzles, such as nozzles 452, 454. The nozzles 452, 454 are shown to be angularly shaped. However, the nozzles 452, 454 may be configured to have any other shape. The fluidic structure 440 further includes a flow feature layer 460 configured in between the ejection chip 410 and the nozzle plate 450. The flow feature layer 460 is composed of an organic material. The flow feature layer 460 includes a plurality of flow features, such as flow features 462, 464. Each flow feature of the plurality of flow features is configured in fluid communication with one or more corresponding nozzles of the plurality of nozzles and one or more corresponding fluid ejecting elements of the at least one fluid ejecting element. Specifically, the flow feature 462 is configured in fluid communication with the corresponding nozzle 452 and the corresponding fluid ejecting element 430. Similarly, the flow feature 464 is configured in fluid communication with the corresponding nozzle 454 and the corresponding fluid ejecting element 432.

The fluidic structure 440 also includes a liner layer 470 encapsulating the nozzle plate 450 such that each nozzle of the plurality of nozzles is coated with the liner layer 470. The liner layer 470 encapsulates the nozzle plate 450 such that a portion 472 of the liner layer 470 covers a top surface 456 of the nozzle plate 450. The liner layer 470 further at least partially encapsulates the each flow feature of the plurality of flow features, such as the flow features 462, 464. The liner layer 470 is composed of an inorganic material.

Figure 5:
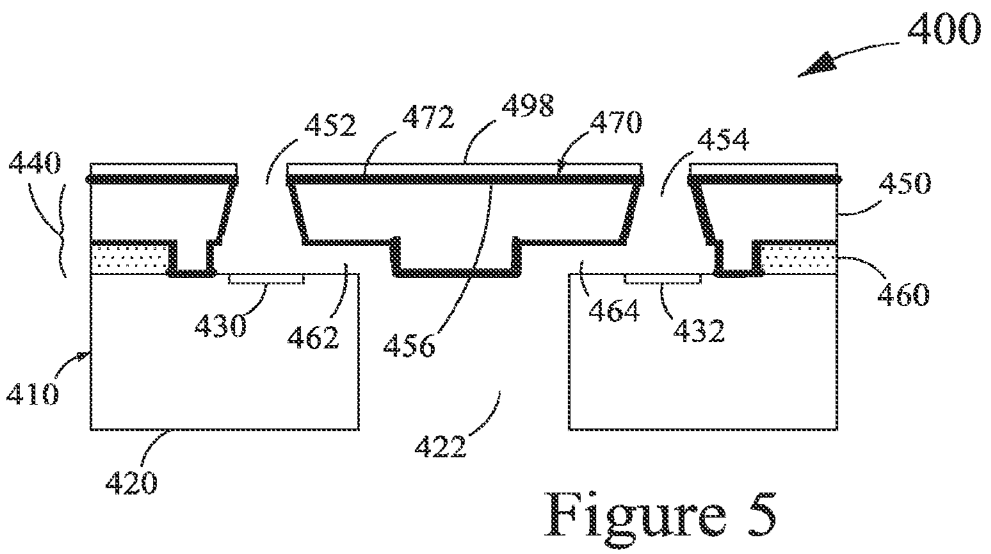
FIG. 5 depicts the ejection device of FIG. 4 with a layer of hydrophobic material thereupon.

As depicted in FIG. 5, the election device 400 also includes a layer 495 of a 215 hydrophobic material deposited over the portion 472 of the liner layer 470. Such a layer may be composed of any hydrophobic material as known in the art for coating components of ejection devices.

It will be evident that materials used for manufacturing/construction of the nozzle plate 450, the flow feature layer 460, and the liner layer 470 may be the same as described for the manufacturing of the nozzle plate 150, the flow feature layer 160, and the liner layer 170, of the ejection device 100 of FIG. 1.

Figure 6:
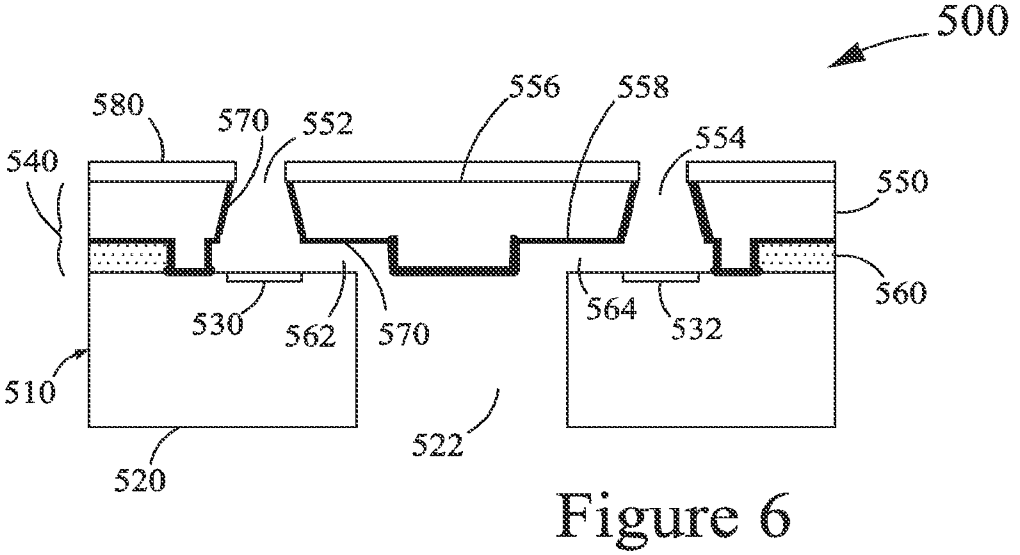
FIG. 6 depicts an ejection device for an inkjet printer, in accordance with still another embodiment of the present disclosure.

FIG. 6 depicts an ejection device 500 for an inkjet printer. The ejection device 500 includes an ejection chip 510. The ejection chip 510 includes a substrate 520. The substrate 520 includes at least one fluid via, such as a fluid via 522. Further, the ejection chip 510 includes at least one fluid ejecting element, such as fluid ejecting elements 530, 532, carried by the substrate 520. The fluid electing elements 530, 532 are adapted to elect a fluid, such as an ink. Further, the at least one fluid via of the substrate 520 is adapted for feeding the fluid to one or more fluid ejecting elements of the at least one fluid ejecting element. Specifically, the fluid via 522 is adapted to feed the fluid to the fluid ejecting elements 530, 532.

The substrate 520 may also include a plurality of slots (not shown). Each slot of the plurality of slots may be adapted for feeding the fluid to one or more fluid ejecting elements of the at least one fluid ejecting element, such as the fluid ejecting elements 530, 532.

The ejection device 500 further includes a fluidic structure 540 configured over the ejection chip 510. The fluidic structure 540 includes a nozzle plate 550 composed of an organic material. The nozzle plate 550 includes a plurality of nozzles, such as nozzles 552, 554. The nozzles 552, 554 are shown to be angularly shaped. However, the nozzles 552, 554 may be configured to have any other shape. The fluidic structure 540 further includes a flow feature layer 560 configured in between the ejection chip 510 and the nozzle plate 550. The flow feature layer 560 is composed of an organic material. The flow feature layer 560 includes a plurality of flow features, such as flow features 562, 564. Each flow feature of the plurality of flow features is configured in fluid communication with one or more corresponding nozzles of the plurality of nozzles and one or more corresponding fluid ejecting elements of the at least one fluid ejecting element. Specifically, the flow feature 562 is configured in fluid communication with the corresponding nozzle 552 and the corresponding fluid electing element 530. Similarly, the flow feature 564 is configured in fluid communication with the corresponding nozzle 554 and the corresponding fluid ejecting element 532. The flow feature layer 560 may also include a wall (not shown) configured between each two consecutive slots of the plurality of the slots of the substrate 520.

The fluidic structure 540 also includes a first liner layer 570 deposited between the flow feature layer 560 and the nozzle plate 550 for coating a bottom surface 558 of the nozzle plate 550 and each nozzle of the plurality of nozzles, such as the nozzles 562, 564; and for at least partially encapsulating the each flow feature of plurality of flow features, such as the flow features 562, 564. In addition, the first liner layer 570 may also encapsulate respective walls (not shown) configured between the each two consecutive slots of the plurality at the slots of the substrate 520. The first liner layer 570 is composed of an inorganic material.

The fluidic structure 540 also includes a second liner layer 580 deposited over a top surface 556 of the nozzle plate 550. The second liner layer 580 is composed of a hydrophobic material. Such a liner layer may be composed of any hydrophobic material as known in the art for coating components of ejection devices.

It will be evident that materials used for manufacturing/constructing of the nozzle plate 550, the flow feature layer 560, and the first liner layer 570 may be the same as described for the manufacturing of the nozzle plate 150, the flow feature layer 160, and the liner layer 170, of the ejection device 100 of FIG. 1.

In another aspect, the present disclosure provides a method 600 for fabricating (constructing) an ejection device, such as the ejection devices 100, 200, 300, 400, and 500, for an inkjet printer. The method 600 is explained in conjunction with FIGS. 7A and 7B.

Figure 7A:
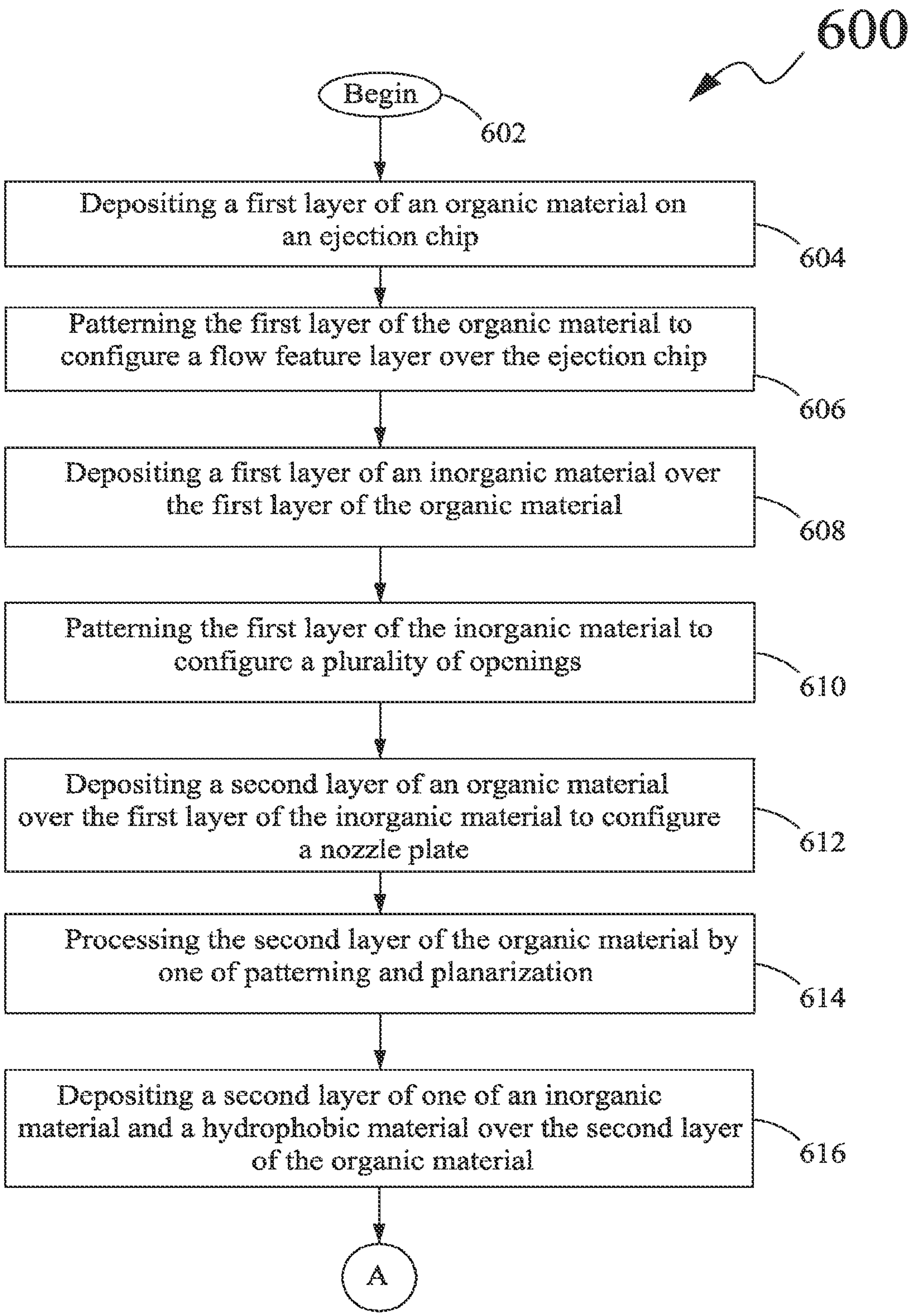
FIGS. 7A and 7B depict a method for fabricating an ejection device for an inkjet printer, in accordance with an embodiment of the present disclosure.
Figure 7B:
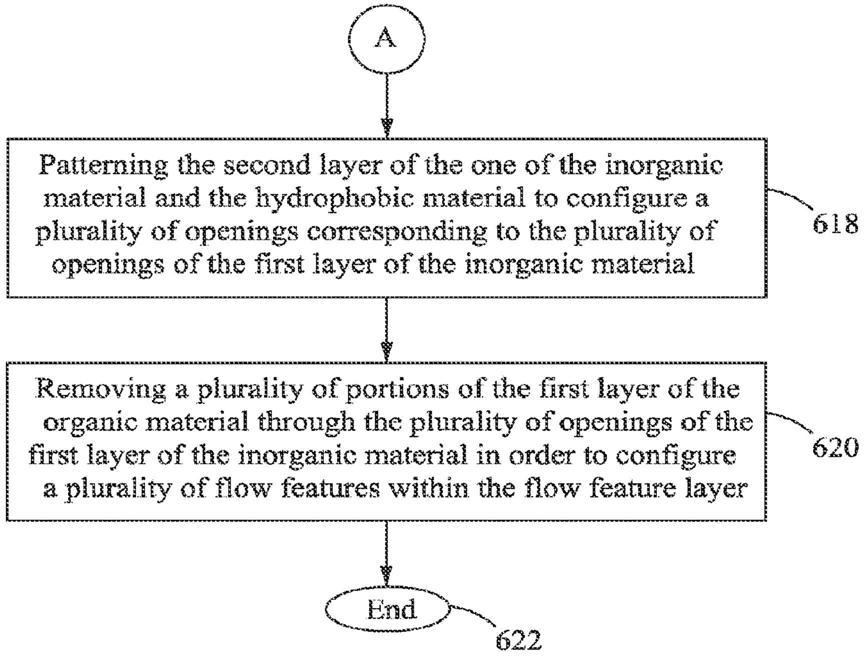

As depicted in FIGS. 7A and 7B, the method 600 begins at 602. At 604, a first layer of an organic material is deposited on an ejection chip. The ejection chip includes a substrate and at least one fluid ejecting element carried by the substrate. At 606, the first layer of the organic material is patterned to configure a flow feature layer over the ejection chip. At 608, a first layer of an inorganic material is deposited over the first layer of the organic material. At 610, the first layer of the inorganic material is patterned to configure a plurality of openings. At 612, a second layer of an organic material is deposited over the first layer of the inorganic material to configure a nozzle plate of the ejection device. At 614, the second layer of the organic material is processed by one of patterning and planarization. At 616, a second layer of one of an inorganic material and a hydrophobic material is deposited over the second layer of the organic material. At 618, the second layer of the one of the inorganic material and the hydrophobic material is patterned to configure a plurality of openings corresponding to the plurality of openings of the first layer of the inorganic material. At 620, a plurality of portions of the first layer of the organic material are removed through the plurality of openings of the first layer of the inorganic material in order to configure a plurality of flow features within the flow feature layer. The method 600 ends at 622.

Either the processing of the second layer of the organic material at 614 or the removal of the plurality of portions of the first layer of the organic material at 620, results in configuring a plurality of nozzles in the nozzle plate. One or more nozzles of the plurality of nozzles are in fluid communication with a corresponding flow feature of the plurality of flow features.

Without departing from the scope of the present disclosure, the sequence of the abovementioned steps should not be considered as a limitation to the present disclosure. Accordingly, the aforementioned steps may be performed in any sequence, as per a manufacturer's preference and the type of ejection device that needs to be fabricated.

Utilization of the method 600 for fabricating the ejection device 100 of FIG. 1 is explained in conjunction with FIGS. 8-22. Specifically, FIGS. 8-22 depict the process flow for the fabrication of the ejection device 100. The ejection device 100 is characteristic of composite nozzle plate 150 fabricated based on a photo-imageable nozzle plate (PINP) process.

Figure 8:
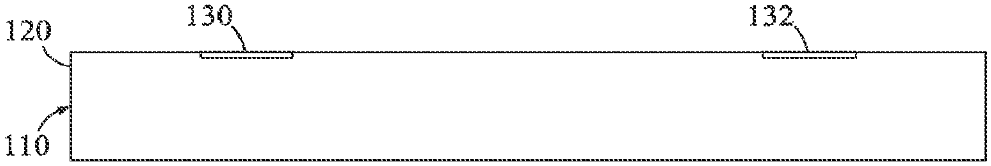
FIGS. 8-19 depict the process flow for the fabrication of the ejection device of FIG. 1, in accordance with an embodiment of the present disclosure.
Figure 9:
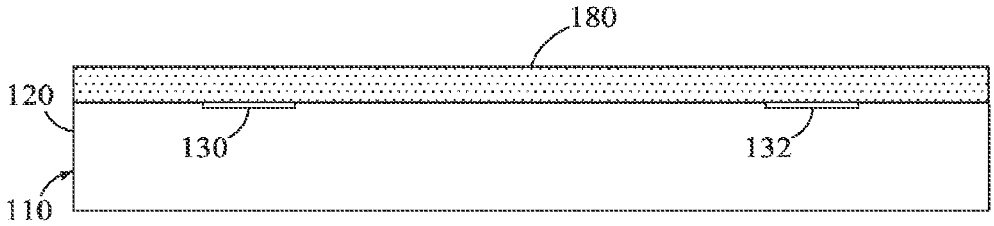
Figure 10:
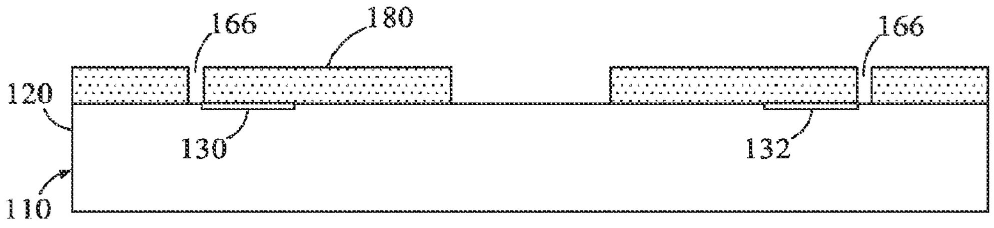
Figure 11:
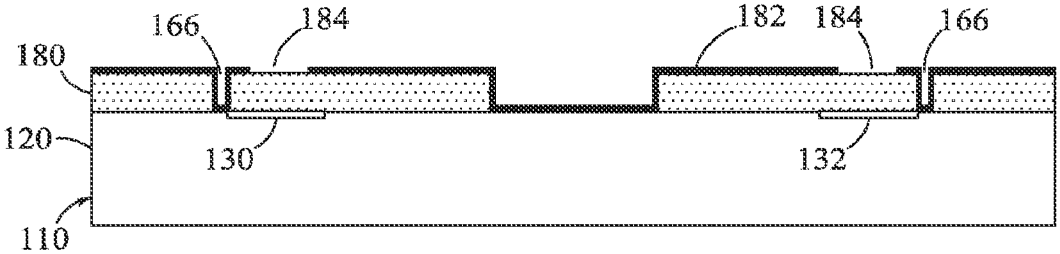
Figure 12:
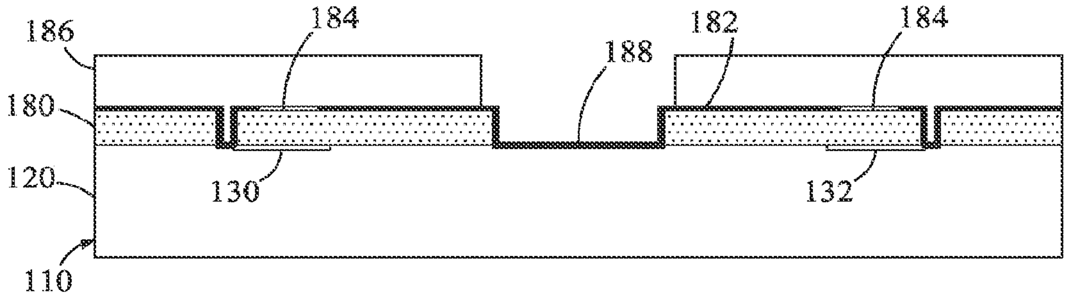
Figure 13:
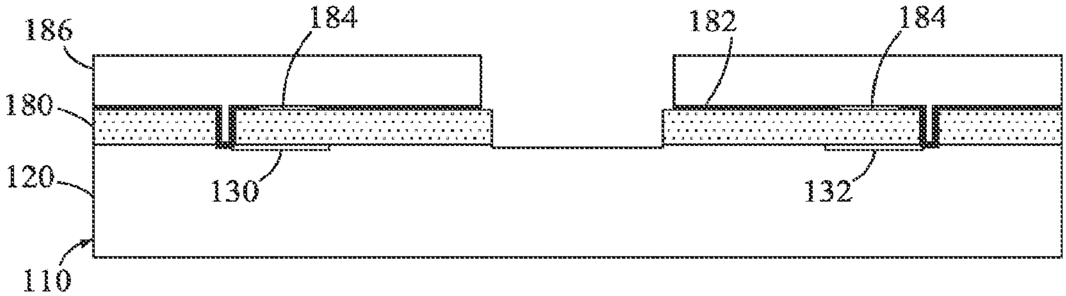
Figure 14:
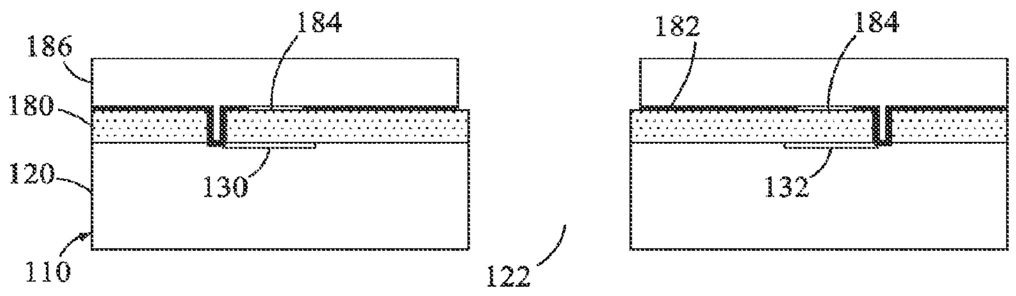

FIG. 8 depicts the ejection chip 110 having the substrate 120 and the fluid ejecting elements 130, 132. FIG. 9 depicts deposition of a first layer 180 of an organic material on the ejection chip 110. As depicted in FIG. 10, the first layer 180 of the organic layer is patterned to configure the flow feature layer 160 over the ejection chip 110. Specifically, the ejection chip 110 may be either spin-coated or laminated using a photoresist material (organic material), and then the first layer 180 of the organic material may be lithographically patterned. Patterning of the first layer 180 of the organic layer assists in forming a plurality of encapsulation trenches 166 within the first layer 180 of the organic material (i.e., the flow feature layer 160 of FIG. 1). As depicted in FIG. 11, a first layer 182 of an inorganic material is deposited over the first layer 180 of the organic material. Further, the first layer 182 of the inorganic material is patterned to configure a plurality of openings 184. Specifically, a conformal protective inorganic coating (e.g. silicon oxide/nitride) may be deposited and patterned to form the openings 184. As depicted in FIG. 12, a photoresist mask 186 is lithographically patterned over the first layer 182 of the inorganic material. Thereafter, a plurality of portions, such as a portion 188, of the first layer 182 of the inorganic material is etched, as depicted in FIG. 13. Further, the substrate 120 of the ejection chip 110 is etched using deep reactive-ion etching (DRIE) technique to configure at least one fluid via, such as the fluid via 122, within the substrate 120, as depicted in FIG. 14.

Each fluid via of the at least one fluid via, such as the fluid via 122, is configured relative to a corresponding portion, such as the portion 188, of the plurality of portions etched in the first layer 182 of the inorganic material. Thereafter, the photoresist mask 186 is removed from the first layer 182 of the inorganic material.

Figure 15:
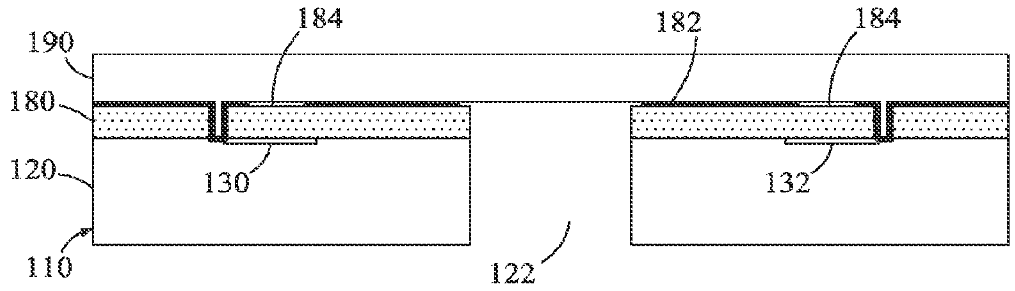
Figure 16:
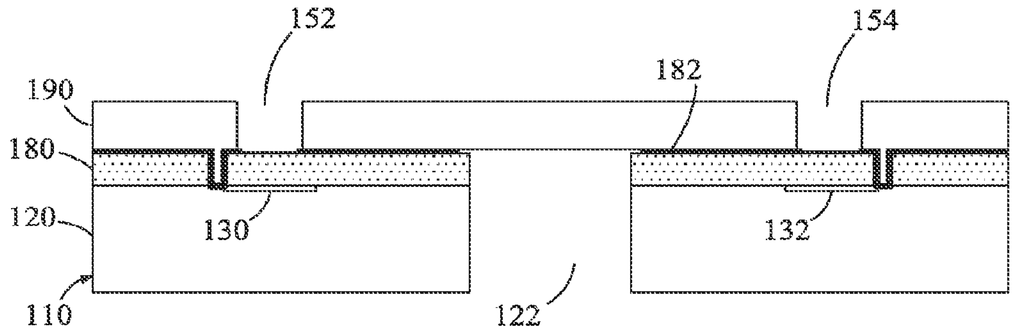

As depicted in FIG. 15, a second layer 190 of an organic material is to deposited over the first layer 162 of the inorganic material to configure the nozzle plate 150 of the ejection device 100. Subsequently, the second layer 190 of the organic material is processed by patterning, as depicted in FIG. 16, to configure the plurality of nozzles, such as the nozzles 152, 154. Specifically, the second layer 190 of the organic material may be laminated over the first layer 182 of the inorganic material and lithographically patterned to form the nozzles 152, 154.

Figure 17:
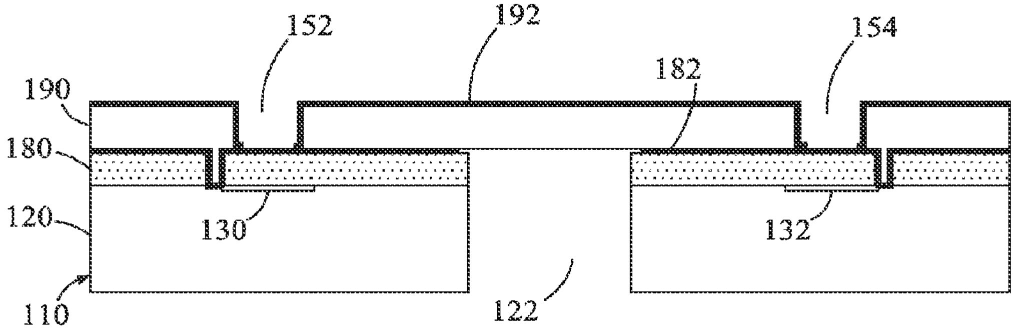
Figure 18:
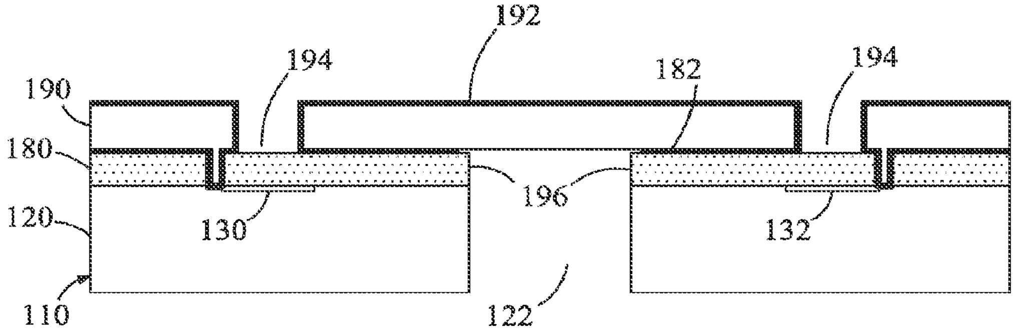

As depicted in FIG. 17, a second layer 192 of an inorganic material (conformal protective inorganic coating) is deposited over the second layer 100 of the organic material. As depicted in FIG. 18, the second layer 192 of the inorganic material is patterned to configure a plurality of openings 194 corresponding to the openings 184, of the first layer of the inorganic material. Specifically, the second layer 192 of the inorganic material may be etched using Inductively Coupled Plasma (ICP) anisotropic etching at bottom portions (not numbered) of each nozzle of the plurality of nozzles. It will be evident that a positive photoresist mask may be used to protect the second layer 192 of the inorganic material coated at a top surface (not numbered) of the second layer 190 of the organic material while some portions of the second layer 192 of the inorganic material are being etched.

Figure 19:
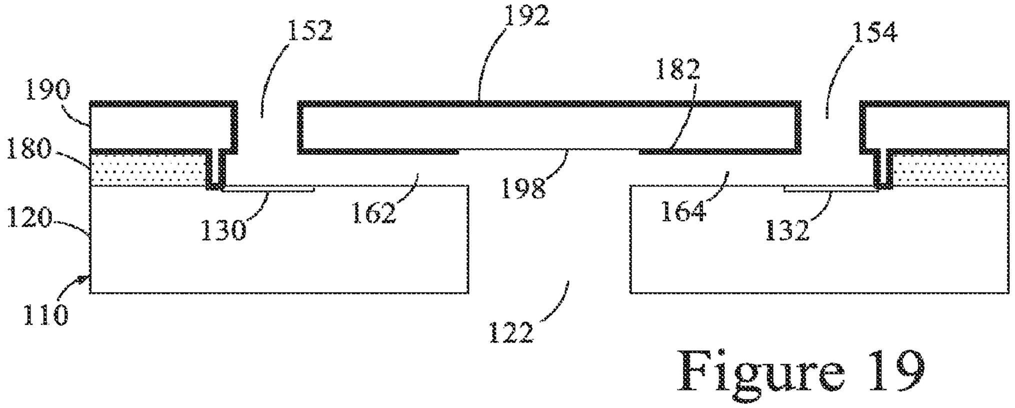

As depicted in FIGS. 18 and 19, plurality of portions 196 (sacrificial polymeric portions) of the first layer 180 of the organic material are removed through the openings 184 of the first layer 182 of the inorganic material in order to configure the plurality of flow features, such as the flow features 162, 164 within the flow feature layer 160 of FIG. 1. Specifically, the portions 196 are removed to form fluid supply channels (micro-fluidic channels) and fluid chambers constituting each flow feature of the plurality of flow features. As depicted in FIG. 1, one or more nozzles of the plurality of nozzles are in fluid communication with a corresponding flow feature of the plurality of flow features. Further, the each fluid via is also adapted to be in fluid communication with one or more corresponding flow features of the plurality of flow features.

The portions 196 of the first layer 180 of the organic material may be completely removed by running an oxygen plasma cleaning from the plurality of nozzles and then from the at least one fluid via. Further, an oxygen plasma Reactive Ion Etching (RIE) cleaning process may etch the first layer 180 of the organic material laterally to some extent due to non-unidirectional ions thereof. Subsequently, etching from both sides may easily tunnel through the first layer 180 of the organic material within a short distance (such as 50 micrometers (μm) long fluid supply channels). Moreover, when the first layer 180 of the organic material is composed of a positive-tone polymeric material, then a solvent soaking process may assist in removing most of the sacrificial structures prior to the final oxygen plasma cleaning. It will be understood that a negative-tone sacrificial polymeric material may take more time to be removed than a positive-tone sacrificial polymeric material.

As mentioned above, the first layer 180 of the organic material has sacrificial polymeric portions (portions 196) inside the each flow feature of the plurality of flow features, wherein the term "sacrificial" relates to a later removal of the material to form the each flow feature. Further and as depicted in FIG. 12, photoresist mask for the DRIE etching of the at least one fluid via, is recessed to some extent with respect to an edge of the sacrificial pattern (i.e., patterned first layer 181) of the organic material for final choke entrance for fluid chambers), and accordingly the portion 188 of the first layer 182 of the organic material is removed prior to DRIE etching (FIG. 12).

Referring to FIGS. 1 and 19, either the first layer 182 of the inorganic material or the second layer 192 of the inorganic material is then deposited on a bottom portion 198 of the second layer 190 of the organic material to encapsulate the nozzle plate 150. Specifically, a line-of-sight deposit (either sputtering or evaporation) may be used to deposit either the first layer 182 of the inorganic material or the second layer 192 of the inorganic material from a back-side (not numbered) of the substrate 120 to completely seal the nozzle plate 150. Based on the foregoing, the first layer 182 of the inorganic material and the second layer 192 of the inorganic material together form the liner layer 170 of the ejection device 100 of FIG. 1.

As mentioned above, the substrate 120 of the ejection chip 110 is etched to configure the at least one fluid via, such as the fluid via 122, within the substrate 120, prior to the deposition of the second layer 190 of the organic material over the first layer 182 of the inorganic material. Further, a layer of a hydrophobic material may also be deposited on the second layer 192 of the inorganic material.

Figure 20:
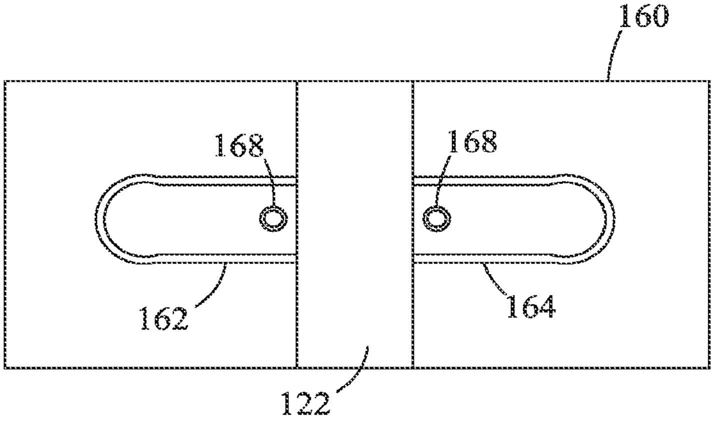
FIG. 20 depicts a top view of the ejection device of FIG. 1 illustrating a patterned flow feature layer (without a nozzle plate) thereof.

FIG. 20 depicts a top view of the ejection device 100 illustrating the patterned flow feature layer 160 (without the nozzle plate 150) of FIG. 1. Further and as depicted in FIG. 20, one or more filtering pillars 168 may be configured within the flow feature layer 160. The one or more filtering pillars 158 assist in splitting the entrance to each fluid chamber in order to filter dust particles, thereby improving the reliability of the plurality of flow features.

Figure 21:
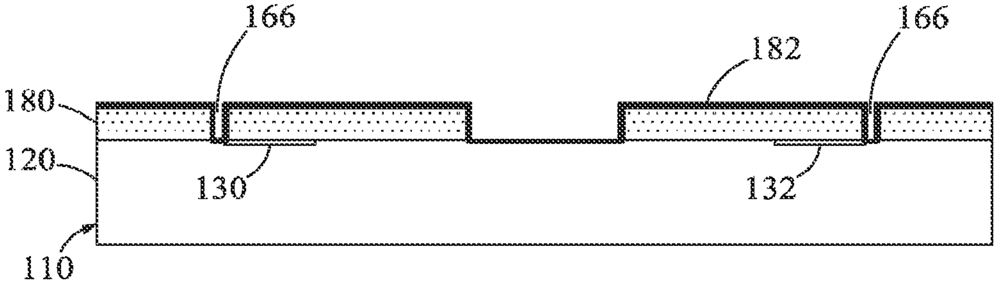
FIGS. 21 and 22 depict partial and complete filling, respectively, of encapsulation trenches of the flow feature layer of the ejection device of FIG. 1.
Figure 22:
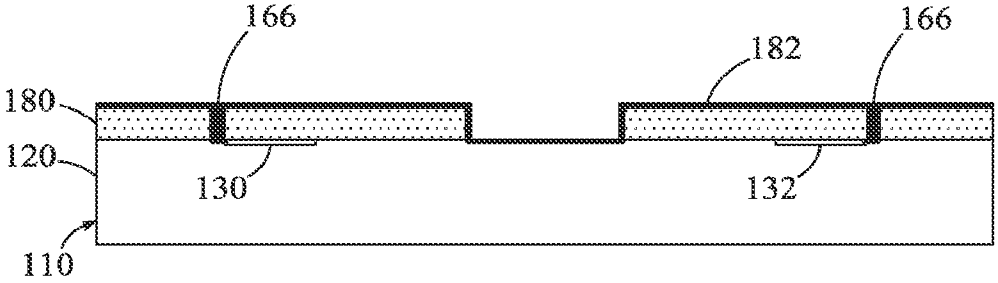

Further, FIGS. 21 and 22 depict partial and complete filling, respectively, of the encapsulation trenches 166 of the flow feature layer 160, by the first layer 162 of the inorganic material as protective coating. Width of each of the encapsulation trenches 166 around the plurality of flow features, such as the flow features 162, 164, may be about 2 μm. However, the width may be determined by photo-imaging capability of the chosen polymer for the first layer 180 of the organic material, at a thickness required for the plurality of flow features. Further, the first layer 182 of the inorganic material (conformal protective inorganic coating) may completely fill the encapsulation trenches 155 when the thickness of the first layer 180 of the organic material is about 1 μm. Alternatively, partial filling for wider encapsulation trenches may also be used due to polymer photo-imaging resolution.

Figure 23:
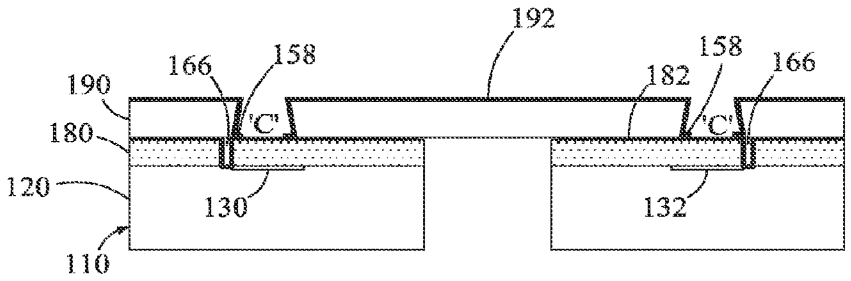
FIGS. 23 and 24 depict a negative profile of nozzles of the nozzle plate of the ejection device of FIG. 1.
Figure 24:
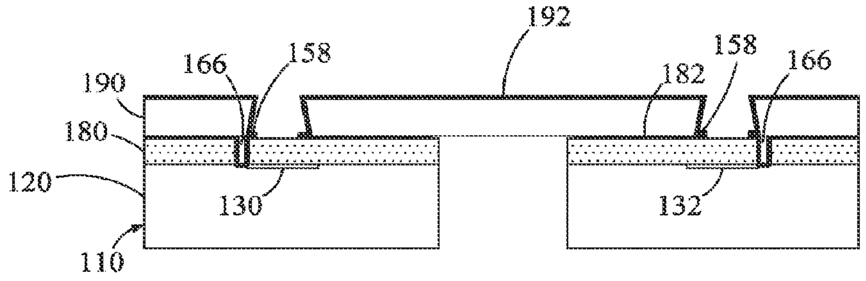

While considering a negative profile of each nozzle, such as the nozzles 152, 154, having a narrower top opening (not numbered) and a wider bottom opening (not numbered), a double thickness of protective coating of the first layer 182 of the inorganic material may be seen at joint corners, such as a joint corner 158, between the nozzle plate 150 (i.e., the second layer 190 of the organic material) and the flow feature layer 150 (i.e., the first layer 180 of the organic material), due to smaller nozzle bore/hole pattern of the protective coating in FIG. 11 than the final nozzle bore pattern in FIG. 1. Specifically, ICP etching may be used to etch a central portion ('C' in FIGS. 23 and 24) at bottom portion not numbered) of the each nozzle, and more specifically, to pattern the second layer 192 of the inorganic material, as depicted in FIG. 18. It may be noted that FIGS. 23 and 24 depict angularly shaped nozzles. However, the shape of the nozzles should not be considered as a limitation to the present disclosure. Thus, FIGS. 23 and 24 depict the scheme to protect joint corners, such as the joint corner 158, between the nozzle plate 150 and the flow feature layer 160. The joint corner 158 may receive two protective coatings of the first layer 182 of the inorganic material and the second layer 192 of the inorganic material, without any etching, while the central portion 'C' at the bottom portion of the each nozzle has the protective coating of the first layer 182 of the inorganic material removed prior to the ICP etching. The negative profile of the each nozzle benefits from such protection. A photoresist mask may be used to protect the top surface 156 of the nozzle plate 150 during such a process of etching.

Utilization of the method 600 for fabricating the ejection device 200 of FIG. 2 is explained in conjunction with FIGS. 25-32. Specifically, FIGS. 25-32 depict the process flow to construct an encapsulated PINP on the ejection chip 210 having the plurality of slots, such as the slots 224, 226 within the substrate 220.

Figure 25:
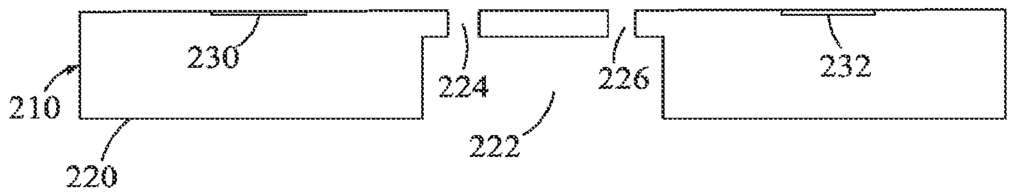
FIGS. 25-32 depict the process flow for the fabrication of the ejection device of FIG. 2, in accordance with an embodiment of the present disclosure.

FIG. 25 depicts the ejection chip 210 having the substrate 220 and the fluid ejecting elements 230, 232. The substrate 220 of the ejection chip 210 includes the plurality of slots, such as the slots 224, 226. Each slot of the plurality of slots is adapted for feeding the fluid to one or more fluid ejecting elements of the at least one fluid ejecting element, such as the fluid ejecting elements 230, 232. The each two consecutive slots of the plurality of the slots are separated by the wall configured within the flow feature layer.

Figure 26:
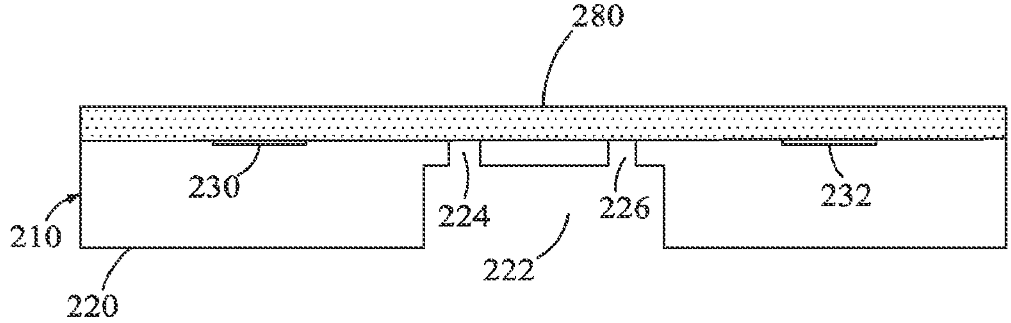
Figure 27:
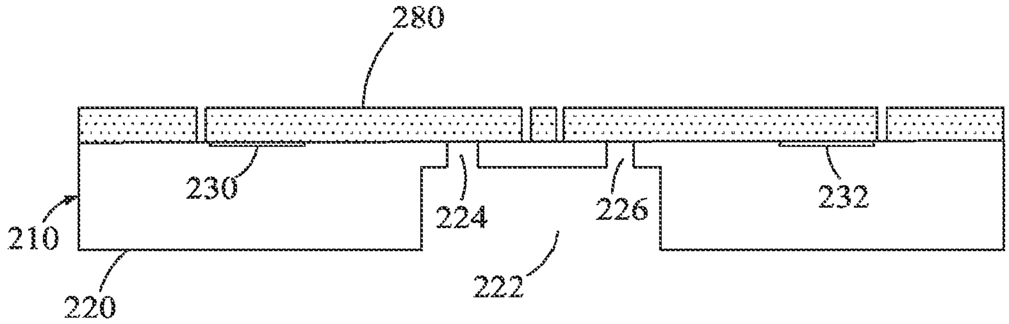
Figure 28:
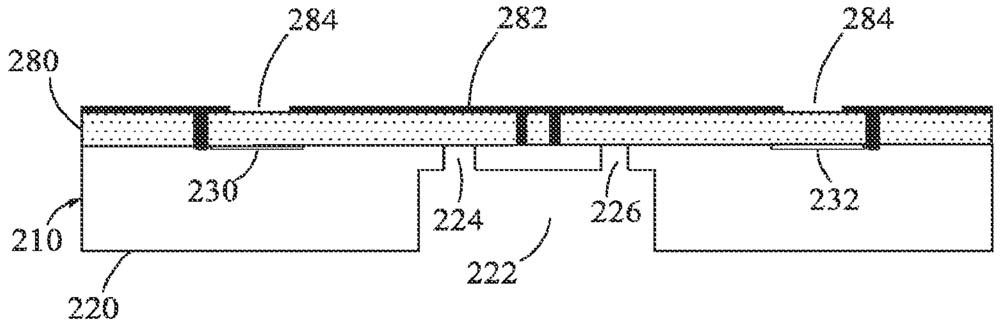
Figure 29:
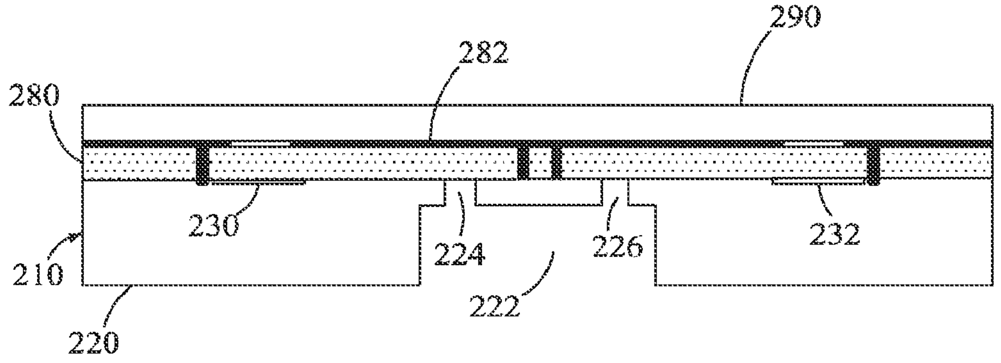
Figure 30:
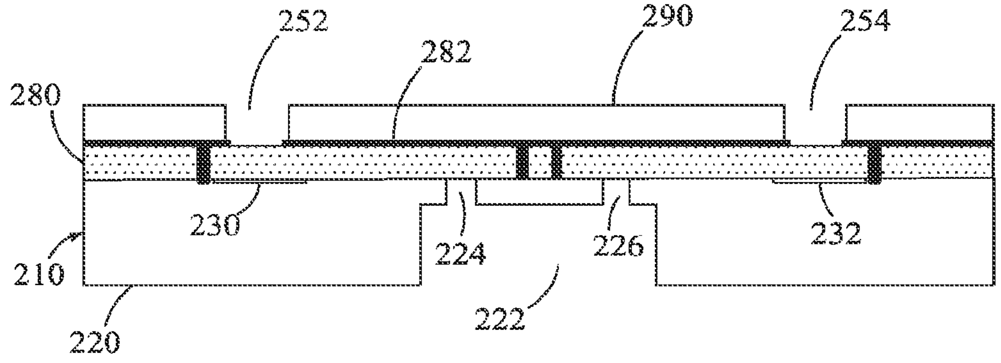

FIG. 26 depicts deposition of a first layer 280 of an organic material on the ejection chip 210. As depicted in FIG. 27, the first layer 280 of the organic layer is patterned to configure the flow feature layer 260 over the ejection chip 210. Specifically, the ejection chip 210 may be either spin-coated or laminated using a photoresist material, and then the first layer 280 of the organic material may be lithographically patterned. As depicted in FIG. 28, a first layer 282 of an inorganic material (conformal protective inorganic coating) is deposited over the first layer 280 of the organic material. Further, the first layer 282 of the inorganic material is patterned to configure a plurality of openings 284 therewithin. Specifically, the first layer 282 of the inorganic material (e.g. silicon oxide/nitride) may be deposited and patterned to form the openings 284. As depicted in FIG. 29, a second layer 290 of an organic material is deposited over the first layer 282 of the inorganic material to configure the nozzle plate 250 of the ejection device 200. Subsequently, the second layer 290 of the organic material is processed by patterning, as depicted in FIG. 30, to configure the plurality of nozzles, such as the nozzles 252, 254. Specifically, the second layer 290 of the organic material may be laminated and lithographically patterned.

Figure 31:
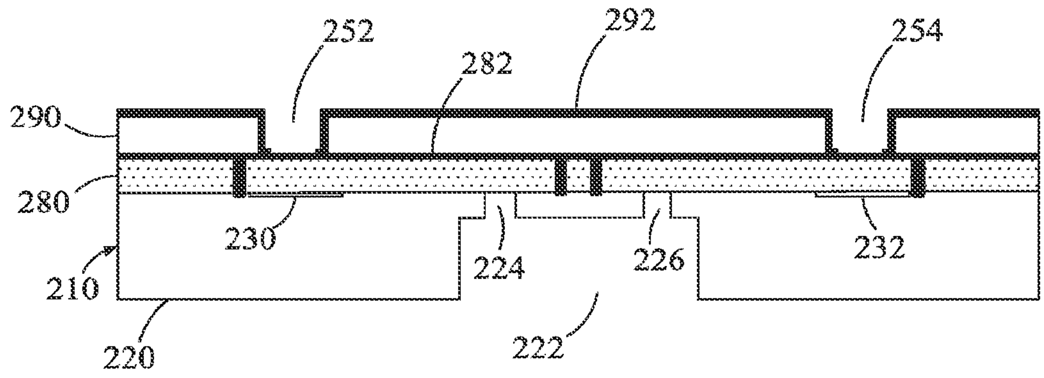
Figure 32:
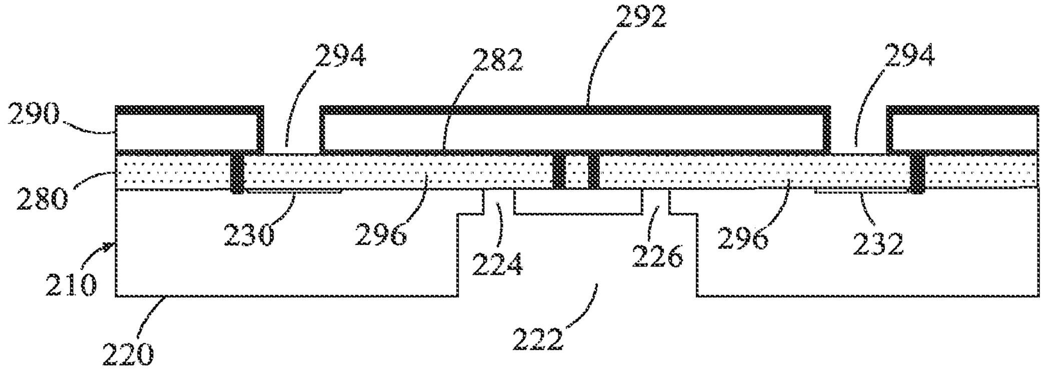

As depicted in FIG. 31, a second layer 292 of an inorganic material (conformal protective inorganic coating) is deposited over the second layer 290 of the organic material. As depicted in FIG. 32, the second layer 292 of the inorganic material is patterned to configure a plurality of openings 294 corresponding to the openings 284, of the first layer 282 of the inorganic material. Specifically, ICP anisotropic etching may be used to etch the second layer 292 of the inorganic material at bottom portion (not numbered) of each nozzle (positive photoresist mask may be used while etching to protect the top surface 256 of the nozzle plate 250). Subsequently, a plurality of portions 295 (sacrificial polymeric portions) of the first layer 280 of the organic material are removed through the openings 284 of the first layer 282 of the inorganic material in order to configure the plurality of flow features, such as the flow features 252, 264 within the flow feature layer 260 of FIG. 2.

As depicted in FIG. 2, one or more nozzles of the plurality of nozzles are in fluid communication with a corresponding flow feature of the plurality of flow features. Further, the each fluid is may be also adapted to be in fluid communication with one or more corresponding flow features of the plurality of flow features. Also, a layer of a hydrophobic material may be deposited on the second layer 292 of the inorganic material.

Figure 33:
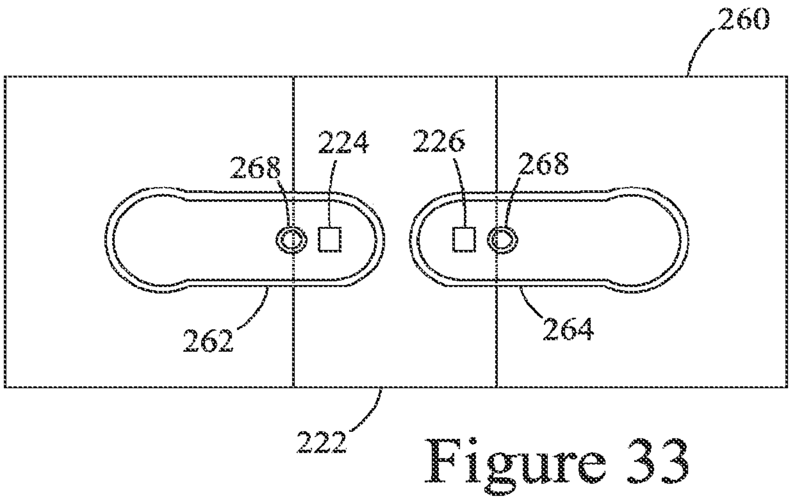
FIG. 33 depicts a top view of the ejection device of FIG. 2 illustrating a patterned flow feature layer (without a nozzle plate) thereof.

FIG. 33 depicts a top view of the ejection device 200 illustrating the patterned flow feature layer 260 (without the nozzle plate 250) of FIG. 2. Further and as depicted in FIG. 33, one or more filtering pillars 268 may be configured within the flow feature layer 260. The one or more filtering pillars 268 assist in splitting the entrance to each fluid chamber in order to filter dust particles, thereby improving the reliability of the plurality of flow features.

Based on the foregoing, the first layer 282 of the inorganic material and the second layer 292 of the inorganic material together form the liner layer 270 of FIG. 2 that also encapsulates the wall, such as the wall 266, between the each two consecutive slots of the plurality of slots of the substrate 220.

Utilization of the method 600 for fabricating the ejection device 300 of FIG. 3 is explained in conjunction with FIGS. 34-41. FIGS. 34-41 depict the process flow to construct an encapsulated PINP on the ejection chip 310 with fluid vias etched by both wet and dry etching.

Figure 34:
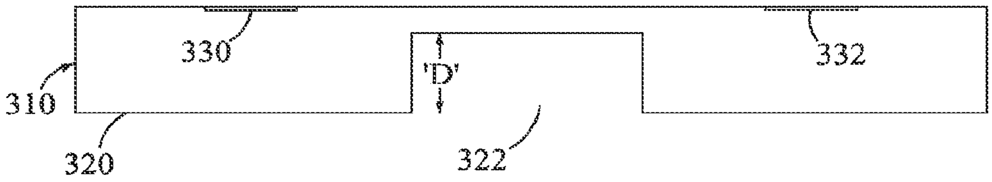
FIGS. 34-41 depict the process flow for the fabrication of the ejection device of FIG. 3, in accordance with an embodiment of the present disclosure.

FIG. 34 depicts the ejection chip 310 having the substrate 320 and the fluid ejecting elements 330, 332. As depicted in FIG. 3, the substrate 320 includes the at least one fluid via, such as the fluid via 322 (partially etched). Specifically, the substrate 320 may be partially DRIE etched from a back-side/bottom portion (not numbered) thereof up to a pre-determined depth 'D', with a thin photoresist covering a top surface not numbered) thereof to protect circuits of the ejection chip 310.

Figure 35:
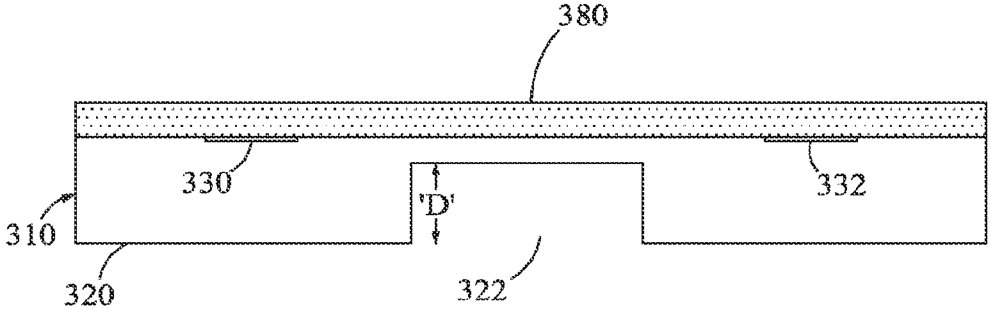
Figure 36:
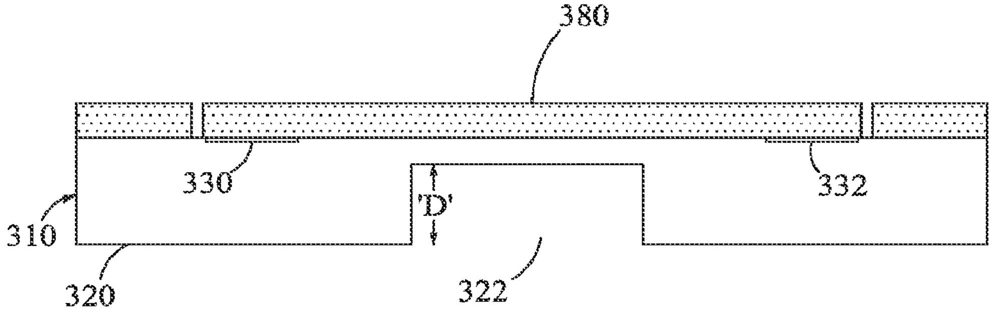
Figure 37:
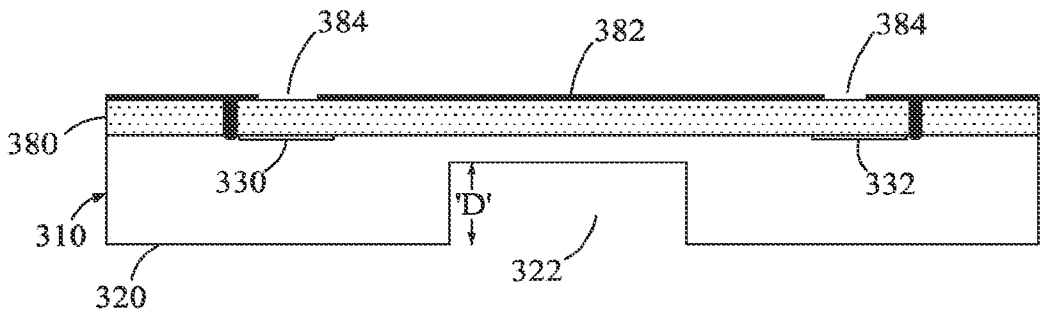
Figure 38:
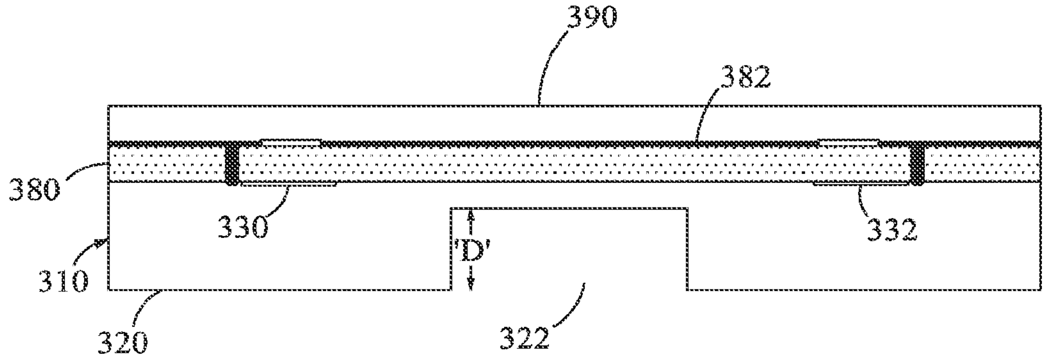
Figure 39:
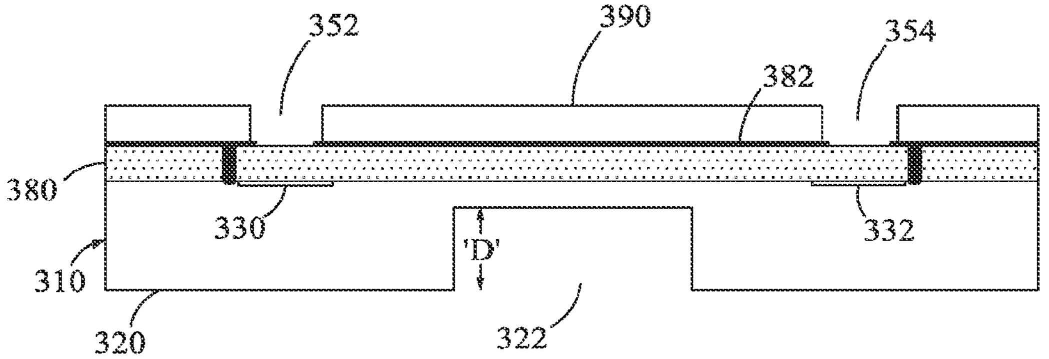
Figure 40:
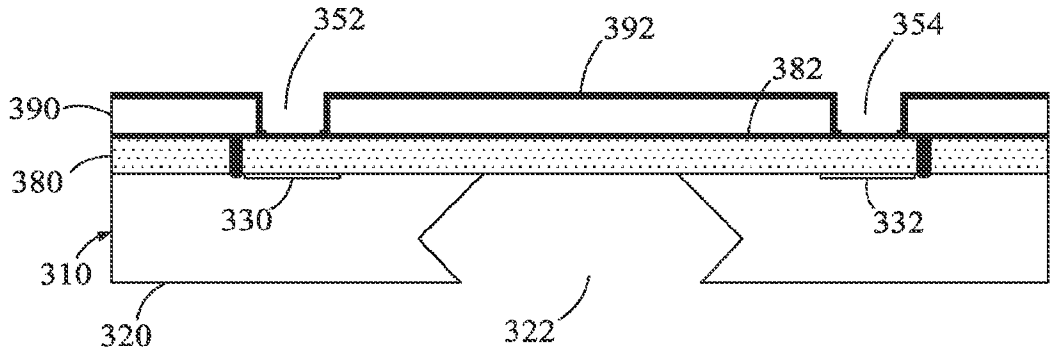

FIG. 35 depicts deposition of a first layer 380 of an organic material on the ejection chip 310. As depicted in FIG. 36, the first layer 380 of the organic layer is patterned to configure the flow feature layer 360 over the ejection chip 310. Specifically, the ejection chip 310 may be either spin-coated or laminated using a photoresist material, and then the first layer 380 of the organic material may be lithographically patterned. As depicted in FIG. 37, a first layer 382 of an inorganic material (conformal protective inorganic coating) is deposited over the first layer 380 of the organic material. Further, the first layer 382 of the inorganic material is patterned to configure a plurality of openings 384. Specifically, the first layer 382 of the inorganic material (e.g. silicon oxide/nitride) may be deposited and patterned to form the openings 384. As depicted in FIG. 38, a second layer 390 of an organic material is deposited over the first layer 382 of the inorganic material to configure the nozzle plate 350 of the ejection device 300. Subsequently, the second layer 390 of the organic material is processed by patterning, as depicted in FIG. 39, to configure the plurality of nozzles, such as the nozzles 352, 354. Specifically, the second layer 390 of the organic material may be laminated and lithographically patterned. As depicted in FIG. 40, a second layer 392 of an inorganic material (conformal protective inorganic coating) is deposited over the second layer 390 of the organic material.

Figure 41:
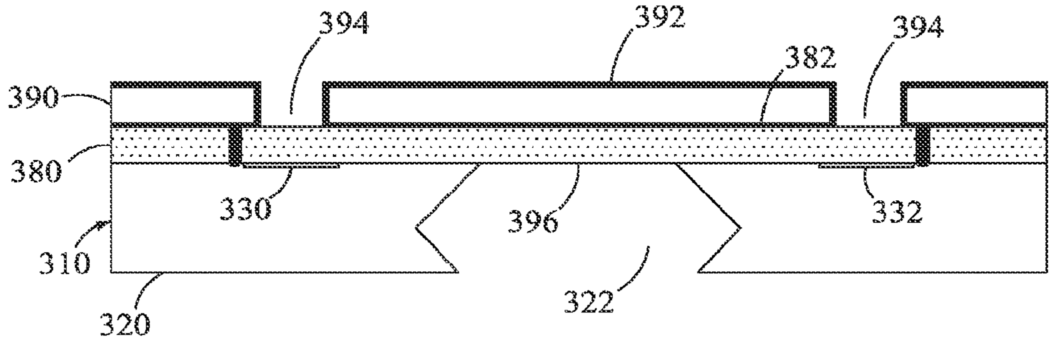

As depicted in FIG. 41, the second layer 392 of the inorganic material is patterned to configure a plurality of openings 394 corresponding to the openings 384, of the first layer 382 of the inorganic material. Specifically, ICP anisotropic etching may be used to pattern the second layer 392 of the inorganic material, at a bottom portion (not numbered) of each nozzle (positive photoresist mask may be used to protect the top surface 356 of the nozzle plate 350 during etching). Subsequently, a plurality of portions, such as a portion 396 (sacrificial polymeric portion), of the first layer 380 of the organic material is removed through the openings 384 of the first layer 382 of the inorganic material in order to configure the plurality of flow features, such as the flow features 362, 364 within the flow feature layer 360 of FIG. 3. As depicted in FIG. 3, one or more nozzles of the plurality of nozzles are in fluid communication with a corresponding flow feature of the plurality of flow features. Further, the each fluid via is also adapted to be in fluid communication with corresponding one or more flow features of the plurality of flow features.

Without departing from the scope of the present disclosure, the at least one fluid via, such as the fluid via 322, may be formed by patterning a photoresist mask over the first layer 382 of the inorganic material prior to the configuration of the plurality of flow features in the flow feature layer 360. Subsequently, the substrate 320 may be etched from a bottom portion (not numbered) of the substrate 320 up to a pre-determined depth 'D' using DRIE technique, as depicted in FIGS. 34-39. Thereafter, the substrate 320 is further etched from the bottom portion up to a top portion (not numbered) of the substrate 320 using anisotropic wet etching technique to configure at least one fluid via, such as the fluid via 322, within the substrate 320, as depicted in FIG. 40. The substrate 320 may be etched during/after the deposition of the second layer 392 of the inorganic material and prior to the configuration of the plurality of flow features in the flow feature layer 360.

It should be understood that DRIE process is unsuitable for forming the at least one fluid via after the formation of thick polymer patterns (nozzle plates and flow feature layers) due to weak conductivity of the polymeric materials. Further, due to fixed angles between the <100> and <111> silicon crystal planes, ejection chips with multiple fluid vias need to have enough total width to include many fluid vias with a practical seal distance, i.e., the ejection chips may not be appropriately shrunk with conventional DRIE etched fluid vias. Therefore, wet chemical etching, i.e., anisotropic wet etching, provides advantages related to cleaner and hydrophilic etched surfaces without additional cleaning steps and low cost batch fabrication process, over the DRIE process. Accordingly, the above mentioned hybrid etching process wherein a partial DRIE etching of the fluid via 322 is done prior to the PINP process at a top surface (not numbered) of the ejection chip 310 as depicted in FIG. 34) and a wet chemical etching is done after the PINP process to etch the fluid via 322 until silicon oxide ceiling stops at <111> crystal planes. During the DRIE process, circuit side of the substrate 320 may be protected with a thin photoresist with good heat conduction. The top surface of the ejection chip 310 is still flat without any holes or recesses, and thus conventional PINP process including of spin-coating/laminating of the flow feature layer 360 may be easily conducted. As a result, the hybrid etching process extends the seal distance by 1.415 D ('D' being the pre-determined DRIE etching depth). Therefore, the ejection chip 310 may be shrunk by 1.415 D to maintain the same seal distance between two fluid vias. Further, the ejection chip 310 may further be shrunk to include more fluid vias.

Figure 42:
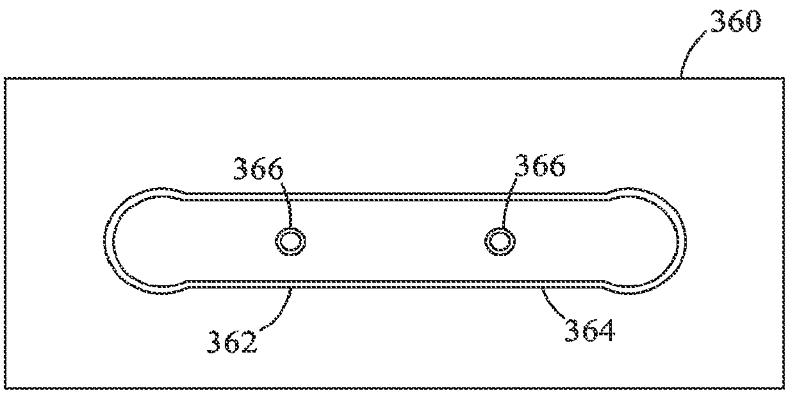
FIG. 42 depicts a top view of the ejection device of FIG. 3 illustrating a patterned flow feature layer (without a nozzle plate) thereof.

FIG. 42 depicts a top view of the ejection device 300 illustrating the patterned flow feature layer 360 (without the nozzle plate 350) of FIG. 3. Further and as depicted in FIG. 42, one or more filtering pillars 366 may be configured within the flow feature layer 360. The one or more filtering pillars 366 assist in splitting the entrance to each fluid chamber in order to filter dust particles, thereby improving the reliability of the plurality of flow features.

Also, a layer of a hydrophobic material may be deposited on the second layer 392 of the inorganic material.

Based on the foregoing, the first layer 382 of the inorganic material and the second layer 392 of the inorganic material together form the liner layer 370 of FIG. 3.

Utilization of the method 600 for fabricating the ejection device 400 of FIG. 4 is explained in conjunction with FIGS. 43-47. Specifically, the ejection device 400 is fabricated by using a four-mask process after the fabrication of the fluid ejecting elements 430, 432 and the associated circuitry on the substrate 420.

Figure 43:
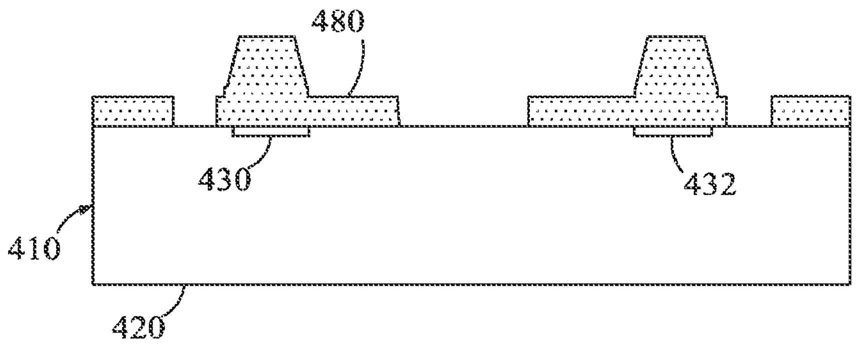
FIGS. 43-47 depict the process flow for the fabrication of the ejection device of FIG. 4, in accordance with an embodiment of the present disclosure.

FIG. 43 depicts the ejection chip 410 having the substrate 420 and the fluid ejecting elements 430, 432. Further, a first layer 480 of an organic material (sacrificial material) is deposited on the ejection chip 410, using a set of masks. Specifically, materials such as polyimide (PI-2600 series from HD Micro System™) may be used for the first layer 480 of the organic material. Such polyimide materials are known for thermal stability exceeding 400° C., and the co-efficient of thermal expansion is much lower than various other polymers and is close to that of conventional inorganic substrate materials. Further, use of polyamide materials broadens the deposition temperature and provides long-term reliability to the plurality of flow features made out of the polyimide materials.

Alternatively, decomposable polymers like Unity sacrificial polymers (polynorbornene) from Promerus may be used. Such polymers are decomposed at an elevated temperature and the by-product may diffuse through a thick oxide layer. Another example of the inorganic material may be amorphous/poly-silicon deposited by either sputtering or PECVD.

As depicted in FIG. 43, the first layer 480 of the organic layer is patterned to configure the flow feature layer 460 over the ejection chip 410. When amorphous/polysilicon is used in the first layer 480 of the organic material, XeF2 dry etch process may be used to remove silicon. Thereafter, patterning of silicon may be conducted using RIE. Further, when either polyimide or a decomposable polymer is selected, then two dry etch processes may be used for non-photo-imageable polymers and two photolithography processes may be used for photo-imageable polymers. Alternatively, a dry etch process and a photolithography may be used. Further, retrograde nozzles (such as the nozzles 452, 454, as depicted in FIG. 4) may be formed by either controlling the dry etch process or the photolithography process.

Figure 44:
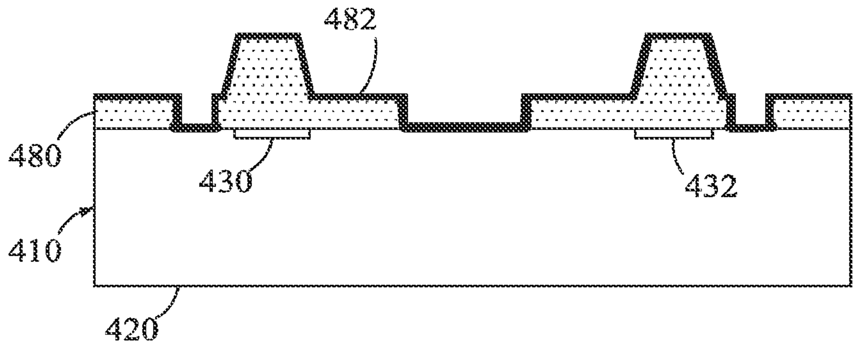

As depicted in FIG. 44, a first layer 482 of an inorganic material is deposited over the first layer 480 of the organic material. The first layer 482 of the inorganic material may be conformably deposited over the first layer 480 of the organic material. The first layer 482 of the inorganic material may be composed of materials, such as silicon oxide, silicon nitride and silicon oxynitride. Further, the first layer 482 of the inorganic material may be hydrophilic in nature that assists the flow features 462, 464 to be refilled with the working fluid effectively.

Figure 45:
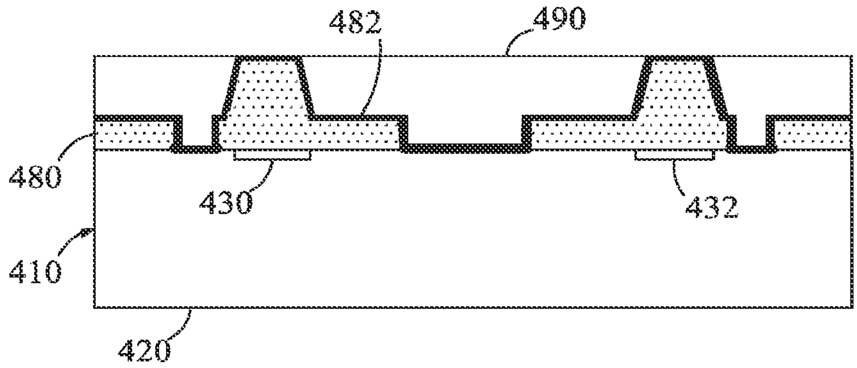

As depicted in FIG. 45, a second layer 490 of an organic material is deposited over the first layer 482 of the inorganic material to configure the nozzle plate 450 of the ejection device 400. Subsequently, the second layer 490 of the organic material is processed by planarization, as depicted in FIG. 45.

The material used for the second layer 490 of the organic material may be a polyimide material (such as PI-2600 series from HD Micro System™). The organic material may form the structure of fluid chambers of the flow feature layer 460, and permanently stays intact during the usage of the ejection device 400. Accordingly, long-term thermal and mechanical stability is achieved. However, before depositing the second layer 490 of the organic material, an aminosilane-based adhesion promoter, such as VM-651 and VM-652 (from DuPont) may be used to enhance adhesion of the second layer 490 of the organic material to the first layer 482 of the inorganic material.

Further, after deposition, the second layer 490 of the organic material may be cured, and the excessive material may be removed by either a chemical mechanical polish (CMP) or a dry etch process (blank dry etch), until tips (not numbered) of the first layer 482 of the inorganic material (that define nozzle holes) are exposed.

Figure 46:
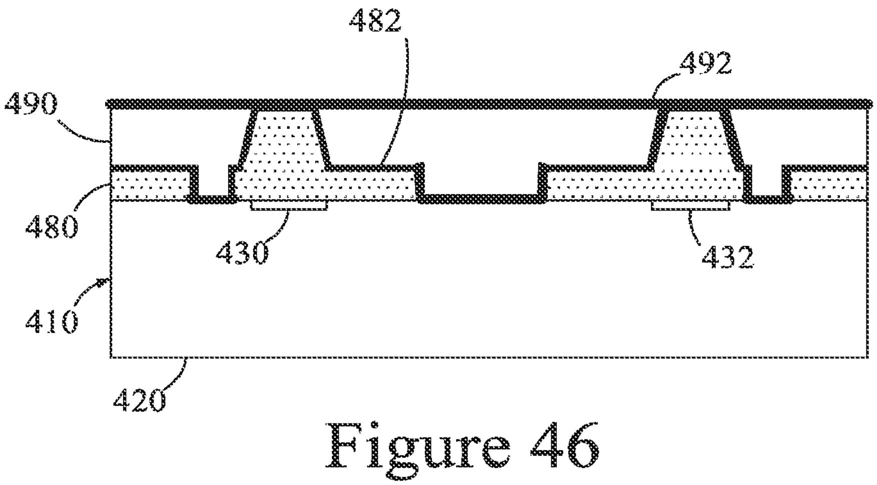

As depicted in FIG. 46, a second layer 492 of an inorganic material is deposited over the second layer 490 of the organic material. The second layer 492 of the inorganic material assists in sealing the second layer 490 of the organic material deposited over the first layer 482 of the inorganic material. The second layer 492 of the inorganic material may be composed of a material, such as silicon oxide, silicon nitride and silicon oxynitride, similar to the material used for composing the first layer 482 of the inorganic material.

Figure 47:
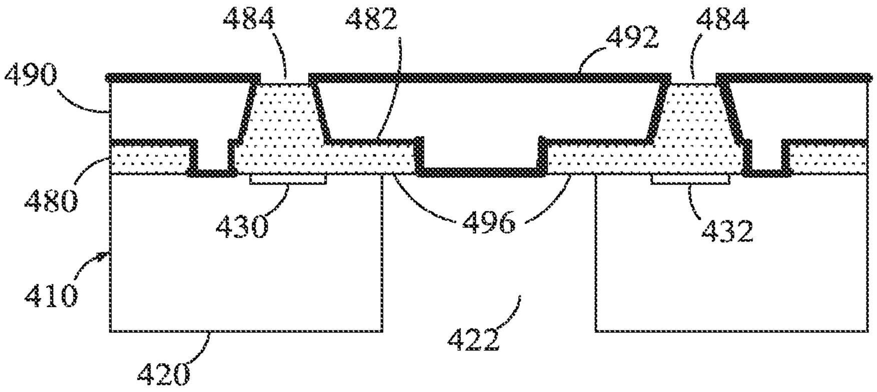

As depicted in FIG. 47, the first layer 482 of the inorganic material is patterned to configure a plurality of openings 484. Further, the second layer 492 of the inorganic material is patterned to configure a plurality of openings (not numbered) corresponding to the openings 484, of the first layer 482 of the inorganic material. The openings 484 may be considered as nozzle openings. Specifically, a third mask may be used for etching the first layer 482 of the inorganic material and the second layer 492 of the inorganic material while configuring the openings 484. The first layer 482 of the inorganic material and the second layer 492 of the inorganic material may be etched using RIP process.

Further and without departing from the scope of the present disclosure, the at least one fluid via, such as the fluid via 422, may be configured within the substrate 420 by using DRIE process with the help of a fourth mask. Specifically, the at least one fluid via may be formed from a back-side of the substrate 420 by DRIE technique. The substrate 420 may be used as a background in order to minimize critical dimension bias on the at least one fluid via and also to shorten the DRIE etch time. Further, the substrate 420 may be etched prior to the configuration of the plurality of flow features in the flow feature layer 460.

Subsequently, a plurality of portions 496 (sacrificial portions) of the first layer 480 of the organic material is removed through the openings 484 of the first layer 482 of the inorganic material in order to configure the plurality of flow features, such as the flow features 462, 464 within the flow feature layer 460 of FIG. 4. The portions 496 may be removed by standard oxygen-plasma photoresist ashing process. The first layer 480 of the organic material and the second layer 490 of the organic material are sealed with the first layer 482 of the inorganic material and the second layer 492 of the inorganic material. Accordingly, additional protection for the first layer 480 of the organic material and the second layer 490 of the organic material during the ashing process is not required.

As depicted in FIG. 47, removal of the portions 496 of the first layer 480 of the organic material also results in configuring the plurality of nozzles, such as the nozzles 452, 454 in the nozzle plate 450. One or more nozzles of the plurality of nozzles are in fluid communication with a corresponding flow feature of the plurality of flow features. Further, as depicted in FIG. 4, the each fluid via is also adapted to be in fluid communication with one or more corresponding flow features of the plurality of flow features.

Also, a layer 498 of a hydrophobic material may be deposited on the second layer 492 of the inorganic material, as depicted in FIG. 5. Specifically, the layer 498 may make the top surface 456 of the nozzle plate 450 to be hydrophobic. Formation of the layer 498 of the hydrophobic material on top of flow features while inner walls of the flow features chamber and the plurality of nozzles is kept hydrophilic, assists in forming an effective ejection device 400.

Based on the foregoing, the first layer 462 of the inorganic material and the second layer 492 of the inorganic material together form the liner layer 470 of FIG. 4.

For fabricating the election device 500 of FIG. 6, the method 600 may be utilized in a manner similar to that as explained in conjunction with FIGS. 43-47 for the fabrication of the ejection device 400. However, a second layer of a hydrophobic material (i.e., the second liner layer 580), instead of a second layer of an inorganic material, is deposited over a second layer of the organic material for fabricating the ejection device 500. Accordingly, the fabrication of the ejection device 500 is herein not explained for the sake of brevity.

Based on the foregoing, the present disclosure provides effective and efficient ejection devices, such as the ejection devices 100, 200, 300, 400, and 500; and a method for fabricating the ejection devices. The ejection devices of the present disclosure include improved flow features composed of an organic material and encapsulated by an inorganic material. The organic material is completely sealed inside the inorganic material (encapsulated with solvent-resistant inorganic protective coatings), and is being protected frown possible damage/degradation caused by reaction between the organic material and a working fluid (i.e., ink). In addition, the combination of the organic material and the inorganic material makes the structure of the flow features (fluid chambers) to be robust. Further, heights of nozzles may be determined by the height of etched sacrificial material and are independent of the thickness of the deposited layers of the inorganic materials. Accordingly, it is more feasible to create longer nozzles in the ejection devices of the present disclosure. Specifically, long nozzles (>10 μm) may be created since it is much easier to deposit and etch a thick organic material (sacrificial material) than a thick inorganic material, such as silicon oxide and silicon nitride. More specifically, the method of the present disclosure assists in an easy fabrication of longer nozzles that are hotter for the directionality of ejected fluid drops and ejecting fluid drops of large sizes/volumes. Also, flat top surfaces of the ejection devices of the present disclosure, facilitate an easy maintenance (wiping) of the ejection devices. Furthermore, various types of fluids (jet solvent based inks, e.g. Ultraviolet inks and aqueous inks) may be used with the ejection devices as the organic material is completely sealed inside the inorganic material. Further, any one of positive tone photo-imageable polymers and negative tone photo-imageable polymers may easily be used for the nozzle plates and flow features of the ejection devices.

The foregoing description of several embodiments of the present disclosure has been presented for purposes of illustration. It is not intended to be exhaustive or to limit the disclosure to the precise forms disclosed, and obviously many modifications and variations are possible in light of the above teaching. It is intended that the scope of the disclosure be defined by the claims appended hereto.

The invention claimed is:

1. A method for fabricating an ejection device for an inkjet printer, the method comprising:

depositing a first layer of an organic material on an ejection chip, the ejection chip comprising a substrate and at least one fluid ejecting element carried by the substrate;

patterning the first layer of the organic material to configure a flow feature layer over the ejection chip;

depositing a first layer of an inorganic material over the first layer of the organic material;

patterning the first layer of the inorganic material to configure a plurality of openings therewithin;

depositing a second layer of an organic material over the first layer of the inorganic material to configure a nozzle plate of the ejection device;

processing the second layer of the organic material by one of patterning and planarization;

depositing a second layer of one of an inorganic material and a hydrophobic material over the second layer of the organic material; patterning the second layer of the one of the inorganic material and the hydrophobic material to configure a plurality of openings corresponding to the plurality of openings of the first layer of the inorganic material; and removing a plurality of portions of the first layer of the organic material through the plurality of openings of the first layer of the inorganic material in order to configure a plurality of flow features within the flow feature layer, wherein one of the processing of the second layer of the organic material and the removal of the plurality of portions of the first layer of the organic material results in configuring a plurality of nozzles in the nozzle plate, and wherein one or more nozzles of the plurality of nozzles are in fluid communication with a corresponding flow feature of the plurality of flow features.

2. The method of claim 1, wherein the second layer of the inorganic material is deposited over the second layer of the organic material.

3. The method of claim 2, further comprising depositing a layer of a hydrophobic material on the second layer of the inorganic material.

4. The method of claim 2, further comprising, patterning a photoresist mask over the first layer of the inorganic material prior to depositing the second layer of the organic material over the first layer of the inorganic material;

etching a plurality of portions of the first layer of the inorganic material;

etching the substrate of the ejection chip to configure at least one fluid via within the substrate, each fluid via of the at least one fluid via being configured relative to a corresponding portion of the plurality of portions etched in the first layer of the inorganic material, the each fluid via further adapted to be in fluid communication with corresponding one or more flow features of the plurality of flow features; and depositing one of the first layer of the inorganic material and the second layer of the inorganic material on a bottom portion of the nozzle plate to encapsulate the nozzle plate.

5. The method of claim 1, wherein the substrate of the ejection chip comprises a plurality of slots, each slot of the plurality of slots being adapted for feeding the fluid to one or more fluid ejecting elements of the at least one fluid ejecting element.

6. The method of claim 5, wherein each two consecutive slots of the plurality of the slots are separated by a wall configured within the flow feature layer, and wherein the wall is encapsulated by the first layer of the inorganic material.

7. The method of claim 1, further comprising, patterning a photoresist mask over the first layer of the inorganic material;

etching the substrate from a bottom portion of the substrate up to a pre-determined depth using deep reactive-ion etching technique; and etching the substrate further from the bottom portion up to a top portion of the substrate using anisotropic wet etching technique to configure at least one fluid via within the substrate, wherein the substrate is being etched prior to the configuration of the plurality of flow features in the flow feature layer, and wherein each fluid via of the at least one fluid via is adapted to be in fluid communication with corresponding one or more flow features of the plurality of flow features.

* * * * *